US012627963B2

(12) United States Patent
Wang et al.

(10) Patent No.: US 12,627,963 B2
(45) Date of Patent: May 12, 2026

(54) METHOD AND APPARATUS FOR DATA TRANSMISSION

(71) Applicant: Samsung Electronics Co., Ltd., Gyeonggi-do (KR)

(72) Inventors: Weiwei Wang, Beijing (CN); Fanhua Kong, Beijing (CN); Hong Wang, Beijing (CN); Lixiang Xu, Beijing (CN)

(73) Assignee: Samsung Electronics Co., Ltd (KR)

( * ) Notice: Subject to any disclaimer, the term of this patent is extended or adjusted under 35 U.S.C. 154(b) by 318 days.

(21) Appl. No.: 18/366,288

(22) Filed: Aug. 7, 2023

(65) Prior Publication Data

US 2024/0048955 A1 Feb. 8, 2024

(30) Foreign Application Priority Data

Aug. 5, 2022 (CN) .......................... 202210939702.0

(51) Int. Cl.
H04W 88/04 (2009.01)
H04W 8/00 (2009.01)
H04W 8/24 (2009.01)

(52) U.S. Cl.
CPC ............. H04W 8/005 (2013.01); H04W 8/24 (2013.01); H04W 88/04 (2013.01)

(58) Field of Classification Search
None
See application file for complete search history.

(56) References Cited

U.S. PATENT DOCUMENTS

| | | | | |
|---|---|---|---|---|
| 12,225,598 | B2 * | 2/2025 | Fujishiro ............... | H04W 48/08 |
| 2019/0166526 | A1 * | 5/2019 | Xu ......................... | H04W 92/20 |
| 2019/0320476 | A1 * | 10/2019 | Wang .................... | H04W 76/15 |
| 2021/0219183 | A1 * | 7/2021 | Huang ............. | H04W 28/0278 |
| 2021/0410031 | A1 | 12/2021 | Akl et al. | |

(Continued)

FOREIGN PATENT DOCUMENTS

| | | |
|---|---|---|
| CN | 111093286 | 5/2020 |
| KR | 1020210025597 | 3/2021 |
| WO | WO 2022/076310 | 4/2022 |

OTHER PUBLICATIONS

Huawei (Bl Cr Rapporteur), ("TP for NR_IAB_enh for BL CR 38.401) Rapporteur Corrections and Cleanups", R3-222125, 3GPP TSG-RAN WG3 Meeting #115-e, Feb. 21-Mar. 3, 2022, 13pg.

(Continued)

*Primary Examiner* — Jason D Cardone
(74) *Attorney, Agent, or Firm* — The Farrell Law Firm, P.C.

(57) ABSTRACT

In a 5G or 6G communication system for supporting a higher data transmission rate, a method performed by a first node in a communication system includes transmitting a first message including first identity information to a second node, and receiving a second message including second identity information from the second node. The first message includes at least one of first forwarding information and first data information, the first forwarding information is used by the second node to forward data on an interface of a node indicated by the first identity information, and the first data information is used to include information of forwarded data on the interface of the node indicated by the first identity information.

20 Claims, 11 Drawing Sheets

Path 1

Path 2

(56) References Cited

U.S. PATENT DOCUMENTS

| | | | |
|---|---|---|---|
| 2022/0117007 A1* | 4/2022 | Akl ....................... | H04W 24/02 |
| 2022/0322464 A1 | 10/2022 | Luo et al. | |
| 2023/0042390 A1* | 2/2023 | Mildh .................. | H04W 48/17 |
| 2023/0199607 A1* | 6/2023 | Adjakple ............. | H04W 76/11 |
| | | | 370/310 |
| 2024/0031893 A1* | 1/2024 | Wu ....................... | H04W 36/08 |
| 2024/0121659 A1* | 4/2024 | Chen .................... | H04W 76/14 |
| 2024/0147346 A1* | 5/2024 | Ronkainen ........... | H04W 40/22 |
| 2024/0276317 A1* | 8/2024 | Pirmagomedov ..... | H04W 36/08 |
| 2024/0324039 A1* | 9/2024 | Wu ....................... | H04W 36/12 |
| 2025/0039765 A1* | 1/2025 | Zhu ...................... | H04W 36/32 |
| 2025/0310838 A1* | 10/2025 | Wu ....................... | H04W 76/27 |

OTHER PUBLICATIONS

International Search Report dated Nov. 10, 2023 issued in counterpart application No. PCT/KR2023/011592, 8 pages.

\* cited by examiner

METHOD AND APPARATUS FOR DATA TRANSMISSION

CROSS-REFERENCE TO RELATED APPLICATION(S)

This application is based on and claims priority under 35 U.S.C. § 119 to Chinese Patent Application No. 202210939702.0, filed on Aug. 5, 2022, in the China National Intellectual Property Administration, the disclosure of which is incorporated herein by reference in its entirety.

BACKGROUND

1. Field

The disclosure relates generally to a wireless communication system, and more particularly, to a method for data transmission performed by a node and a network node in a wireless communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Recently, there are needs to enhance data transmission.

To meet an increasing demand for wireless data communication services since the fourth generation (4G) communication system deployment, efforts have been made to develop an improved 5G or pre-5G communication system also referred to as a beyond 4G network or a post long term evolution (LTE) system.

Wireless communication is a most successful innovation. Recently, a number of subscribers of wireless communication services has exceeded 5 billion. With the increasing popularity of smart phones and other mobile data devices such as tablet computers, notebook computers, netbooks, e-book readers and machine-type devices, a demand for wireless data services continues to increase. Therefore, it is necessary to improve efficiency and coverage of currently existing wireless interfaces.

To expand the coverage of NR networks, a relay network architecture, IAB teaches donor nodes (anchor nodes) (donor/donor node (anchor node)) and relay nodes (e.g., IAB nodes). The donor node (anchor node) may be an integrated base station, or a base station consists of a central unit (CU) and a distributed unit (DU). The relay node includes a mobile terminal function and a distributed unit function or may include a mobile terminal portion and a distributed unit portion. The mobile terminal portion is used to communicate with a node at a higher level of the relay node, and the distributed unit portion is used to communicate with a node at a lower level of the relay node. A connection is established between the distributed unit portion and the donor node (anchor node) and serves a UE accessing the distributed unit portion. The network, including the IAB node is a relay network. To further expand the coverage of the network, it has been contemplated to consider the movement of the relay node, such as deploying a relay node on a vehicle, to enable the relay node to provide service for the users in the vehicle. However, communication in such service is unreliable in the prior art.

Specifically, after NR is introduced into the relay network, the scenario where the relay node is stationary is mainly considered. However, the movement of the relay node may also be considered. In the process of moving, the relay node needs to frequently change the connected donor node (anchor node). As multiple UEs may have accessed under the relay node, such movement may inevitably lead to large signaling overhead which interrupts the data transmission of the UE. In addition, there may be no direct interface between the donor nodes (anchor nodes) that the relay node may access, which may also interrupt UE data transmission because the conventional technology is deficient in supporting the handover of a relay node between two donor nodes (anchor nodes) without a direct interface.

As such, there is a need in the art to enhance data transmission in a wireless communication system.

SUMMARY

The disclosure has been made to address at least the above-mentioned problems and/or disadvantages and to provide at least the advantages described below.

Accordingly, an aspect of the disclosure is to provide a method and apparatus by which data transmission in a wireless communication system can be efficiently enhanced.

Another aspect of the disclosure is to provide a method and apparatus for supporting the handover of the relay node between two donor nodes (or anchor nodes) without a direct interface in the moving process of the relay node.

Another aspect of the disclosure is to provide a method and apparatus for ensuring continuous data transmission of a distributed unit portion of the relay node and the central unit of the connected donor node (or anchor node).

In accordance with an aspect of the present disclosure, a method performed by a first node in a communication system includes transmitting a first message including first identity information to a second node, and receiving a second message including second identity information from the second node, wherein the first message includes at least one of first forwarding information or first data information, wherein the first forwarding information is used for the second node to forward data on an interface of a node indicated by the first identity information, or wherein the first data information is used to contain information of forwarded data on the interface of the node indicated by the first identity information.

In accordance with another aspect of the present disclosure, a method performed by a second node in a communication system includes receiving a first message including first identity information from a first node, and transmitting a second message including second identity information to the first node, wherein the first message includes at least one of first forwarding information or first data information, wherein the first forwarding information is used for the second node to forward data on an interface of a node indicated by the first identity information, or wherein the first data information is used to contain information of forwarded data on the interface of the node indicated by the first identity information.

In accordance with another aspect of the present disclosure, a first node in a communication system includes a transceiver, configured to transmit and receive a signal, and a controller, coupled with the transceiver and configured to transmit a first message including first identity information to a second node, and receive a second message including second identity information from the second node, wherein the first message includes at least one of first forwarding information or first data information, wherein the first forwarding information is used for the second node to forward data on an interface of a node indicated by the first identity information, or wherein the first data information is used to contain information of forwarded data on the interface of the node indicated by the first identity information.

In accordance with another aspect of the present disclosure, a second node in a communication system includes a transceiver, configured to transmit and receive a signal, and a controller, coupled with the transceiver and configured to receive a first message including first identity information from a first node, and transmit a second message including second identity information to the first node, wherein the first message includes at least one of first forwarding information or first data information, wherein the first forwarding information is used for the second node to forward data on an interface of a node indicated by the first identity information, or wherein the first data information is used to contain information of forwarded data on the interface of the node indicated by the first identity information.

In accordance with an aspect of the present disclosure, a method performed by a thirteenth node in a communication system is provided. The method may include: sending a first message including first identity information to a fourteenth node; and receiving a second message including second identity information from the fourteenth node. The first message may include at least one of first forwarding information and first data information; the first forwarding information is used for the fourteenth node to forward data on an interface of a node indicated by the first identity information, or the first data information is used to include information of the forwarded data on the interface of the node indicated by the first identity information. The second message may include at least one of second forwarding information and second data information; the second forwarding information is used for the thirteenth node to forward data on an Interface of a node Indicated by the second identity information, or the second data information is used to include information of forwarded data on the interface of the node indicated by the second identity information.

In some implementations, in the method performed by the thirteenth node, the first data information may include at least one of the following information: target identity information, data packet information, and data packet configuration information.

In some implementations, in the method performed by the thirteenth node, the first forwarding information may include at least one of the following information: data identity information, first configuration information, and second configuration information.

In some implementations, in the method performed by the thirteenth node, the target identity information may include at least one of the following information: identity information of a target node, and identity information of a tracking area.

In some implementations, in the method performed by the thirteenth node, the data packet configuration information may include at least one of the following information: first address information, first port information, and first endpoint identity information.

In some implementations, in the method performed by the thirteenth node, the data identity information may include at least one of the following information: traffic identity information, identity information of backhaul link information, address information, identity information of a protocol data unit (PDU) session, identity information of a quality of service (QoS) flow, identity information of a data radio bearer (DRB), identity information of a tunnel, and identity information of a transport layer association.

In some implementations, in the method performed by the thirteenth node, the first configuration information may include at least one of the following information: third address information, third port information, and third endpoint identity information.

In some implementations, in the method performed by the thirteenth node, the second configuration information may include at least one of the following information: second address information, second port information, and second endpoint identity information.

In accordance with another aspect of the present disclosure, a method performed by a fourteenth node in a communication system is provided. The method may include: receiving a first message including first identification information from a thirteenth node; and sending a second message including second identity information to the thirteenth node. The first message may include at least one of first forwarding information and first data information, the first forwarding information is used for the fourteenth node to forward data on an interface of a node indicated by the first identity information, or the first data information is used to include information of the forwarded data on the interface of the node indicated by the first identity information. The second message may include at least one of second forwarding information and second data information, the second forwarding information is used for the thirteenth node to forward data on an interface of a node indicated by the second identity information, or the second data information is used to include information of the forwarded data on the interface of the node indicated by the second identity information.

In some implementations, in the method performed by the thirteenth node and/or the fourteenth node, the combination of the thirteenth node and the fourteenth node may be at least one of the following combinations: a source donor node (anchor node) and a source access and mobility management function (AMF), a source AMF and a source session management function (SMF), a source SMF and a source user plane function (UPF), a source AMF and a target AMF, a target AMF and a target donor node (anchor node), a target AMF and a target SMF, a target SMF and a target UPF, a control plane portion of a central unit of a source donor node (anchor node) and a user plane portion of the central unit of the source donor node (anchor node), a control plane portion of a central unit of a target donor node (anchor node) and a user plane portion of the central unit of the target donor node (anchor node), and a central unit of a target donor node (anchor node) and a distributed unit of the target donor node (anchor node).

In accordance with an aspect of the present disclosure, a method performed by a first node in a communication system is provided. The method may include: sending a third message to a second node; and receiving a configuration message from the second node to notify a user equipment to handover. The third message includes configuration information, and the configuration information indicates configuration information for serving user equipment after the first node accesses a third node.

In some implementations, the method performed by the first node may further include: receiving a fifth message from the third node; and sending a sixth message to the third node.

In some implementations, in the method performed by the first node, the fifth message may be in response to the fourth message sent from the second node to the third node.

In some implementations, in the method performed by the first node, the configuration message for notifying the user equipment to handover may be in response to a seventh message sent from the third node to the second node.

In some implementations, in the method performed by the first node, the fourth message may be used to request a handover of at least one user equipment.

In some implementations, in the method performed by the first node, the configuration information may include configuration information of at least one user equipment, and the configuration information of at least one user equipment may include at least one of the following information: identity information of a user equipment, identity information of an associated cell, and configuration information of a user service.

In some implementations, in the method performed by the first node, the identity information of the user equipment may include at least one of the following information: identity information of the user equipment when accessing the second node, and identity information of the user equipment when accessing the third node.

In some implementations, in the method performed by the first node, the configuration information of the user service may include at least one of the following information: identity information of a serving cell, information related to a radio bearer, and resource configuration information.

In some implementations, in the method performed by the first node, the fifth message may be used to establish a context of a user equipment. The fifth message may include configuration information of at least one user equipment. For one user equipment, the fifth message may include at least one of the following information: third identity information of a user equipment, third identity information of an associated cell, and third configuration information of a user service.

In some implementations, in the method performed by the first node, the sixth message may include configuration information of at least one user equipment on the first node side. For one user equipment, the sixth message may include at least one of the following information: fourth identity information of a user equipment, fourth identity information of an associated cell, and fourth configuration information of a user service.

In some implementations, in the method performed by the first node, the third configuration information of the user service may include at least one of the following information: third identity information of a serving cell, and third information related to a radio bearer.

In some implementations, in the method performed by the first node, the fourth configuration information of the user service may include fourth information related to a radio bearer.

In accordance with another aspect of the present disclosure, a method performed by a second node in a communication system is provided. The method may include: receiving a third message from a first node, wherein the third message includes configuration information, and the configuration information indicates configuration information for serving the user equipment after the first node accesses a third node.

In some implementations, in the method performed by the second node, the configuration information may include configuration information of at least one user equipment, and the configuration information of the at least one user equipment may include at least one of the following information: identity information of a user equipment, identity information of an associated cell, and configuration information of a user service.

In some implementations, the method performed by the second node may further include: sending a fourth message to the third node; receiving a seventh message from the third node; and sending a configuration message to a first node to notify user equipment to handover.

In some implementations, in the method performed by the second node, the fifth message may be in response to the fourth message sent from the second node to the third node, and the sixth message may be in response to the fifth message sent from the third node to the first node.

In some implementations, in the method performed by the second node, the fourth message may be used to request a handover of at least one user equipment. For one user equipment, the fourth message may include at least one of the following information: second identity information of a user equipment, second identity information of an associated cell, and second configuration information of a user service.

In some implementations, in the method performed by the second node, the seventh message may include configuration information of at least one user equipment on the third node side.

In some implementations, in the method performed by the second node, the second configuration information of the user service may include at least one of the following information: second identity information of a serving cell, and second information related to a radio bearer.

In some implementations, in the method performed by the second node, the second information related to the radio bearer may include at least one of the following information: identity information of the radio bearer, quality of service QoS information of the radio bearer, identity information of a QoS flow, and identity information of a protocol data unit PDU session.

According to another aspect of the present disclosure, a method performed by a third node in a communication system is provided. The method may include: receiving a fourth message from a second node, wherein the fourth message may be in response to a third message sent from a first node to the second node, the third message may include configuration information, and the configuration information indicates configuration information for serving user equipment after the first node accesses the third node.

In some implementations, the method performed by the third node may further include: sending a fifth message to the first node; receiving a sixth message from the first node; and sending a seventh message to the second node.

According to another aspect of the present disclosure, a method performed by a first node in a communication system is provided. The method may include: sending an eighth message to a third node; and receiving a configuration message from a second node to notify user equipment to handover. The eighth message may include configuration information, and the configuration information may indicate configuration information for serving the user equipment after the first node accesses the third node.

In some implementations, the method performed by the first node may further include: receiving an eleventh message from the third node.

In some implementations, in the method performed by the first node, the eleventh message may be in response to a tenth message received by third node transmitted from the second node, the tenth message may be in response to a ninth message sent from the third node; and the configuration message for notifying the user equipment to handover may be in response to a twelfth message sent from the third node to the second node.

In some implementations, in the method performed by the first node, the configuration information may include configuration information of at least one user equipment, the configuration information of the at least one user equipment may include at least one of the following information: fifth identity information of a user equipment, fifth identity information of an associated cell, and fifth configuration information of a user service.

In some implementations, in the method performed by the first node, the fifth identity information of the user equipment may include at least one of the following information: identity information of the user equipment when accessing the second node, and identity information of the user equipment when accessing the third node.

In some implementations, in the method performed by the first node, the fifth configuration information of the user service may include at least one of the following information: fifth identity information of a serving cell, fifth information related to a radio bearer or a list of fifth information related to the radio bearer, and fifth resource configuration information.

In some implementations, in the method performed by the first node, the fifth information related to the radio bearer may include at least one of the following information: identity information of the radio bearer, quality of service QoS information of the radio bearer, tunnel information serving the radio bearer on the first node side, and information of a QoS flow.

In some implementations, in the method performed by the first node, the eleventh message may include configuration information of at least one user equipment on the third node side. For one user equipment, the eleventh message may include at least one of the following information: seventh identity information of a user equipment, seventh identity information of an associated cell, and seventh configuration information of a user service.

In some implementations, in the method performed by the first node, the seventh configuration information of the user service may include seventh information related to a radio bearer.

According to another aspect of the present disclosure, a method performed by a third node in a communication system is provided. The method may include: receiving an eighth message from a first node, wherein the eighth message may include configuration information, and the configuration information may indicate configuration information for serving the user equipment after the first node accesses a third node.

In some implementations, the method performed by the third node may further include: sending a ninth message to a second node; receiving a tenth message from the second node; sending an eleventh message to the first node; and sending a twelfth message to the second node.

In some implementations, in the method performed by the third node, the ninth message may be used to request to acquire configuration information of at least one user equipment served by the first node at the second node. For one user equipment, the ninth message may include at least one of the following information: sixth identity information of a user equipment, sixth identity information of an associated cell, and sixth configuration information of a user service.

In some implementations, in the method performed by the third node, the tenth message may include a context of at least one user equipment requested by the third node and served by the first node.

In some implementations, in the method performed by the third node, the eleventh message may include configuration information of at least one user equipment on the third node side; and the configuration information of the at least one user equipment on the third node side may include at least one of the following information: seventh identity information of a user equipment, seventh identity information of an associated cell, and seventh configuration information of a user service.

In some implementations, in the method performed by the third node, the twelfth message may include configuration information of at least one user equipment after handover to a cell served by the third node.

In some implementations, in the method performed by the third node, the sixth configuration information of the user service may include at least one of the following information: sixth identity information of a serving cell, and first information related to a service.

In some implementations, in the method performed by the third node, the seventh configuration information of the user service may at least include seventh information related to a radio bearer.

In accordance with another aspect of the present disclosure, a method performed by a second node in a communication system is provided. The method may include: receiving a ninth message from a third node, wherein the ninth message may be in response to an eighth message sent from a first node to the third node, wherein the eighth message may include configuration information, and the configuration information may indicate configuration information for serving user equipment after the first node accesses the third node.

In some implementations, the method performed by the second node may further include: sending a tenth message to the third node; receiving a twelfth message from the third node; and sending a configuration message to the first node to notify user equipment to handover.

In accordance with another aspect of the present disclosure, a network node is provided. The network node may include: a transceiver, configured to send and receive a signal; and a controller, coupled to the transceiver and configured to perform the method performed by the thirteenth node, the fourteenth node, the first node, the second node and/or the third node above.

BRIEF DESCRIPTION OF DRAWINGS

The foregoing and other aspects, features and advantages of certain embodiments of the present disclosure will become more apparent from the following description with reference to the accompanying drawings, in which.

DETAILED DESCRIPTION

Figure 1:
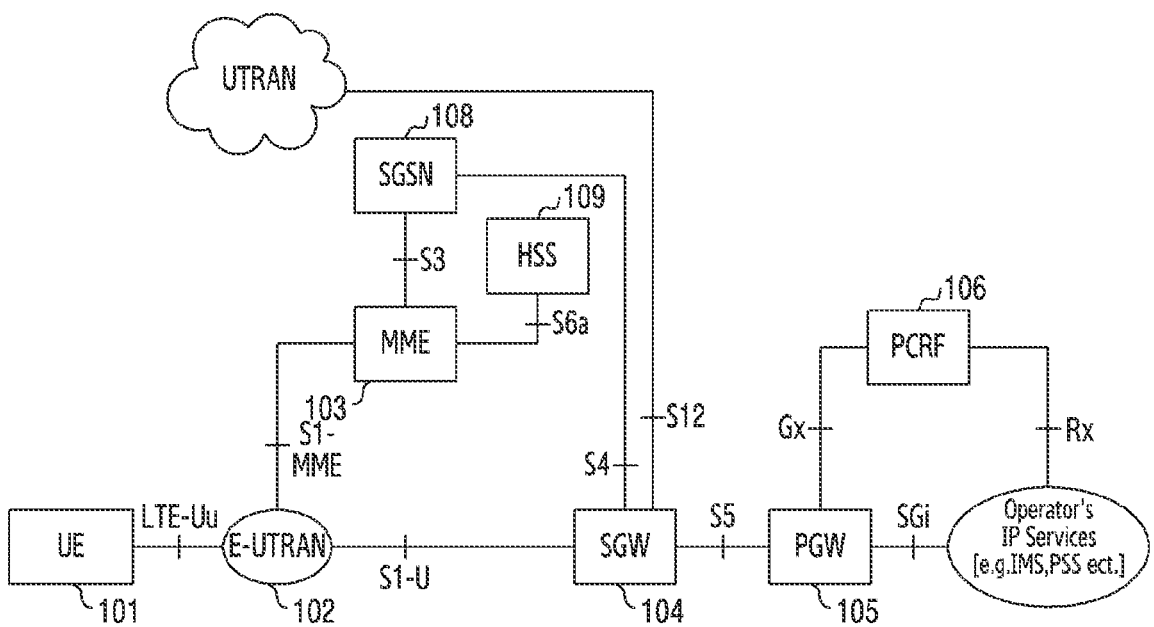
FIG. 1 illustrates an example of system architecture evolution (SAE) to which the disclosure is applied.

Embodiments of the disclosure will be described in detail with reference to the accompanying drawings. The terms which will be described below are terms defined in consideration of the functions in the disclosure, and may be different according to users, intentions of operators, or customs. Therefore, the definitions of the terms should be made based on the contents throughout the disclosure. In addition, descriptions of well-known functions and constructions may be omitted for the sake of clarity and conciseness.

The terms and words used in the following description and claims are not limited to the bibliographical meanings and are merely used by the inventor to enable a clear and consistent understanding of the present disclosure. Accordingly, it should be apparent to those skilled in the art that the following description is provided for illustration purposes only and not for the purpose of limiting the present disclosure.

The singular forms "a," "an," and "the" include plural referents unless the context clearly dictates otherwise. Thus reference to "a component surface" includes reference to one or more of such surfaces.

The term "include" or "may include" refers to the existence of a corresponding disclosed function, operation or component which can be used in various embodiments of the present disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

Unless defined differently, all terms used herein, which include technical terminologies or scientific terminologies, have the same meaning as that understood by a person skilled in the art to which the present disclosure pertains. Such terms as those defined in a generally used dictionary are to be interpreted to have the meanings equal to the contextual meanings in the relevant field of art and are not to be interpreted to have ideal or excessively formal meanings unless clearly defined in the present disclosure.

Herein, the steps in respective processes may be executed in combination with each other or may also be executed separately. The execution steps of respective processes are only examples, and other possible execution steps and/or orders are not excluded.

The BS may be a 5G base station (e.g., a gNB, a ng-eNB), or may also be a 4G base station (e.g., an eNB), or may also be other types of access nodes.

The transmission of data refers to the receiving or transmitting of the data.

Uplink data refers to data sent by the relay node to the base station (the donor node), and downlink data refers to data sent by the base station (the donor node) to the relay node.

A structure of the relay node referred to in the schematic illustration includes a mobile terminal portion and a distributed unit portion; and the interface between the distributed unit portion of the relay node and the donor node (or the central unit of the donor node) is the F1 interface. However, the solution of the present disclosure is also applicable to relay nodes of other structures. In one embodiment, another possible structure of the relay node is one that includes a mobile terminal portion and a base station portion; and an interface between the base station portion and the donor node (or the central unit of the donor node) is an Xn/X2 interface.

The terms "handover" and "migration" have the same meaning, i.e., the base station to which a node or UE is connected has changed, such as changed from a source base station to a target base station.

The base station to which the relay node is connected is called a donor node (anchor node), e.g., a source donor node (anchor node), or a target donor node (anchor node). The donor node (anchor node) may be a central unit of the base station, a control plane portion of the central unit of the base station, or a user plane portion of the central unit of the base station. However, the donor node (anchor node) is only a possible node name, and other possible names can be employed.

The text and drawings are provided as examples only to assist in the understanding of the present disclosure. They should not be interpreted as limiting the scope of the present disclosure. Although certain embodiments and examples have been provided, based on the disclosure herein, it will be apparent to those skilled in the art that changes may be made to the illustrated embodiments and examples without departing from the scope of the present disclosure.

FIG. 1 illustrates an example of system architecture evolution (SAE) to which the disclosure is applied.

Referring to FIG. 1, a UE 101 is a terminal device for receiving data. An evolved universal terrestrial radio access network (E-UTRAN) 102 is a radio access network (RAN) including a macro base station (eNodeB/NodeB) that provides the UE 101 with interfaces to access the radio network.

A mobility management entity (MME) 103 is responsible for managing mobility context, session context and security information of the UE 101. A serving gateway (SGW) 104 mainly provides functions of user plane, and the MME 103 and the SGW 104 may be in the same physical entity. A packet data network gateway (PGW) 105 is responsible for functions of charging, lawful interception, etc., and may be in the same physical entity as the SGW 104. A policy and charging rules function entity (PCRF) 106 provides quality of service (QoS) policies and charging criteria. A general packet radio service support node (SGSN) 108 is a device that provides routing for data transmission in a universal mobile telecommunications system (UMTS). A home user service (HSS) 109 is a home subsystem of the UE, and is responsible for protecting user information including a current location of the UE, an address of a serving node, user security information, and packet data context of the UE, etc.

Figure 2:
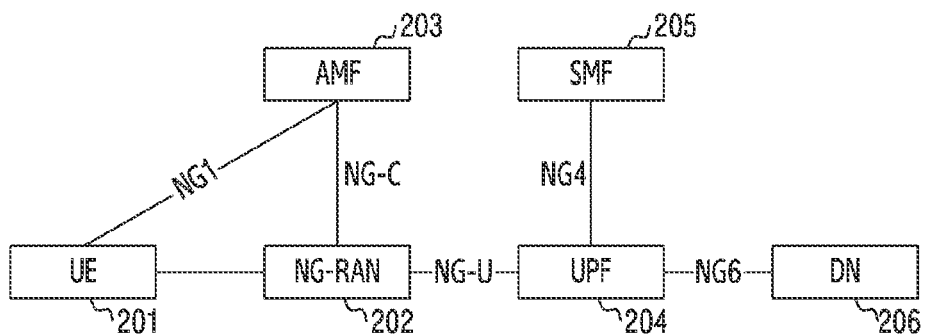
FIG. 2 illustrates an example of a system architecture according to an embodiment.

FIG. 2 illustrates an example according to an embodiment.

In FIG. 2, UE 201 is a terminal device for receiving data. A next generation radio access network (NG-RAN) 202 includes a base station (a gNB or an eNB connected to 5G core network (5GC), and the eNB connected to the 5GC is also referred to as an ng-gNB that provides UE with interfaces to access the radio network. An access control and mobility management function entity (AMF) 203 is responsible for managing mobility context and security information of the UE. A user plane function entity (UPF) 204 mainly provides user plane functions. A session management function entity SMF 205 is responsible for session management. A data network (DN) 206 includes services of operators, access of Internet and service of third parties.

Figure 3:
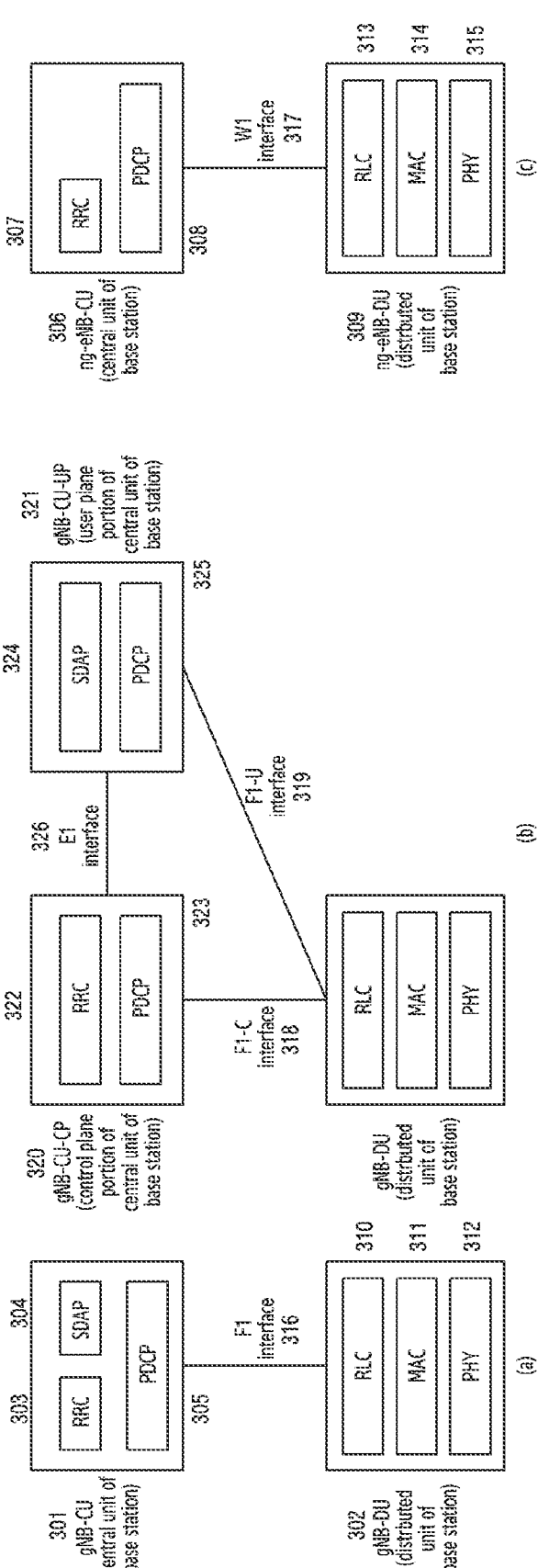
FIG. 3 illustrates a base station structure according to an embodiment.

FIG. 3 is an example of a base station structure according to an embodiment. In the NR system, in order to support network function virtualization and more efficient resource management and scheduling, a base station (a gNB/a ng-eNB) that provides a UE with a wireless network interface can be further divided into a central unit gNB-CU/ng-eNB-Cu (gNB central unit/ng-eNB central unit) 301, 306 and a distributed unit gNB-DU/ng-eNB-DU (gNB distributed unit/ng-eNB distributed unit) 302, 309 (abbreviated as CU and DU herein), as shown in section (a) of FIG. 3. The gNB-CU 301 has radio resource control (RRC) 303, service data adaptation protocol (SDAP) 304, and packet data convergence protocol (PDCP) 305 layers, etc., and the ng-eNB-CU 306 has RRC 307 and PDCP 308 layers. The gNB-DU/ng-eNB-DU 302, 309 has radio link control (RLC) 310, 313 protocol, medium access control (MAC) 311, 314, and physical (PHY) 312, 315 layers, etc. A standardized public interface F1 316 is provided between the gNB-CU 301 and the gNB-DU 302, and a standardized public interface W1 317 is provided between the ng-eNB-CU 306 and ng-eNB-DU 309. The F1 interface 316 is divided into a F1-C 318 for a control plane portion and a F1-U 319 for a user plane portion. A transport network layer of the F1-C 318 transmits based on the Internet protocol (IP). In order to transmit signaling more reliably signaling, a stream control transmission protocol (SCTP) is added above the IP. A protocol of the application layer is F1AP, referring to the standard. The SCTP may provide reliable application layer message transmission. The transmission layer of F1-U 319 is user datagram protocol (UDP)/IP, the general packet radio service (GPRS) tunnel protocol ((GTP)-U is above the UDP/IP and is used to carry a protocol data unit (PDU) of the user plane. As shown in section (b) of FIG. 3, the gNB-CU 301 may include a control plane portion of a central unit of a base station (gNB-CU-CP) 320 and a user plane portion of the central unit of the base station (gNB-CU-UP) 321. The gNB-CU-CP 320 contains functions of the control plane of the base station and has RRC 322 and PDCP 323 layers. The gNB-CU-UP 321 contains functions of the user plane of the base station and has SDAP 324 and PDCP 325 layers. Between gNB-CU-CP 320 and gNB-CU-UP 321 is a standardized public interface E1 326, and the protocol is E1AP, as in the standard. An interface between the control plane portion of the central unit of the base station and the distributed unit of the base station is an F1-C interface 318, that is, a control plane interface of F1, and an interface between the user plane portion of the central unit of the base station and the distributed unit of the base station is an F1-U interface 319, that is, a user plane interface of F1 interface 316. In the NR system, the base station that accesses the 5G core network and provides the evolved-universal terrestrial radio access (E-UTRA) user plane and control plane is referred to as ng-eNB To support virtualization, such base station (ng-eNB) may also be further divided into a central unit ng-eNB-CU (ng-eNB central unit) 306 and a distributed unit ng-eNB-DU (ng-eNB distributed unit) 309 (abbreviated as CU and DU herein), as shown in section (c) of FIG. 3. The ng-eNB-CU 306 has RRC 307 and PDCP 308 layers. The ng-eNB-DU 309 has RLC 313, MAC 314 and physical 315 layers. Between the ng-eNB-CU 306 and the ng-eNB-DU 309 is a standardized public interface W1 317 that is divided into a W1-C interface for the control plane portion and a W1-U interface for the user plane portion. A transmission network layer of the W1-C interface transmits based on the IP. To transmit signaling more reliably, the SCTP protocol is added above the IP. A protocol of the application layer is W1AP, referring to the standard. A transmission layer of the W1-U interface is UDP/IP; and the GTP-U is above the UDP/IP and is used to carry the PDUs of the user plane signaling. In the present disclosure, unless otherwise stated, the base station and the node can be used interchangeably.

Figure 4:
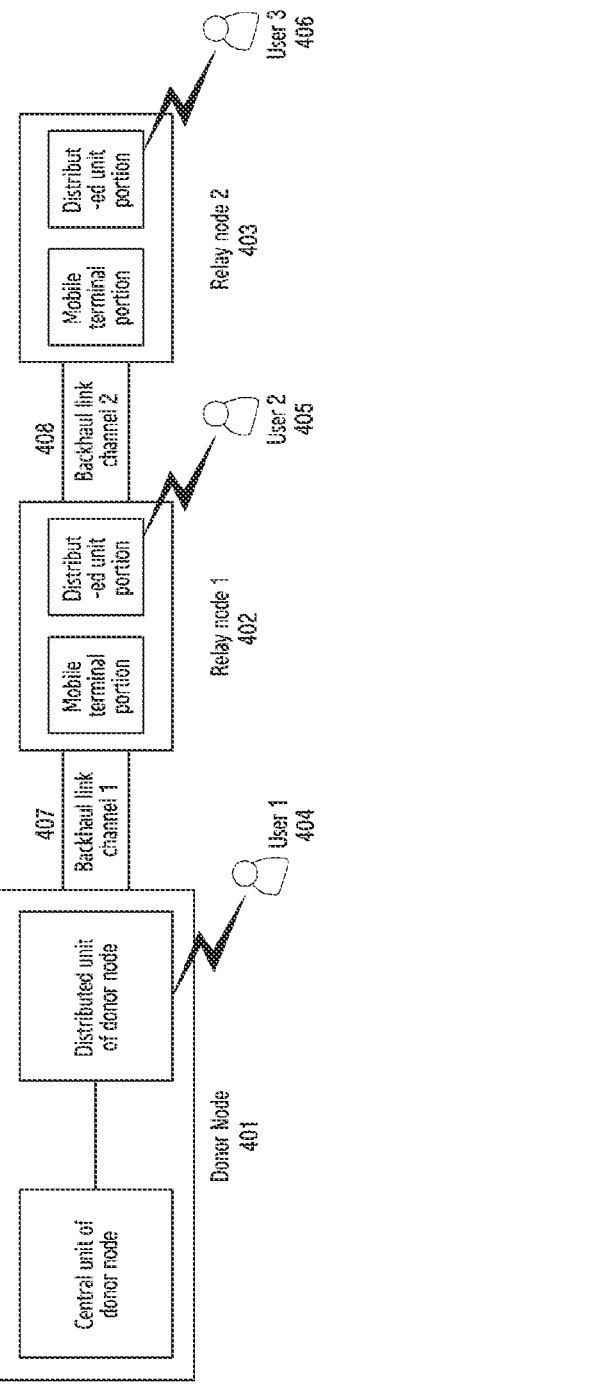
FIG. 4 illustrates an example of a relay network according to an embodiment.

FIG. 4 is an example of a relay network according to an embodiment.

FIG. 4 illustrates a multi-hop relay network (an IAB network), and a network architecture including a donor node 401 (e.g., an IAB donor/donor node 401 (anchor node)) and two relay nodes 402, 403 (e.g., IAB nodes). Users in the multi-hop relay network may access the network through the donor node 401 or a distributed unit of the donor node 401 or the relay node; for example, user 1 (404), user 2 (405) and user 3 (406) respectively access the relay network through (or, via) a distributed unit of a donor node 401, a distributed unit portion of a relay node 1 (402), and a distributed unit portion of a relay node 2 (403). A mobile terminal portion of the relay node is used to communicate with an upper-level node of the relay node (e.g., a mobile terminal portion of the relay node 1 (402) is used to communicate with the donor node 401 or the distributed unit of the donor node 401, and a mobile terminal portion of the relay node 2 (403) is used to communicate with a distributed unit portion of the relay node 1 (402)). A distributed unit portion of the relay node is used to communicate with a lower-level node of the relay node (e.g., a distributed unit portion of the relay node 1 (402) is used to communicate with the user 2 (405), or may also be used to communicate with the mobile terminal portion of the relay node 2 (403)). The mobile terminal portion of the relay node may be regarded as a user accessing the network, such that it has functions of an ordinary user (a non-relay node) (e.g., the mobile terminal portion may set up a signaling radio bearer (SRB) with an upper-level node thereof to send an RRC message, or may also set up a data radio bearer (DRB) to send data). Protocol stacks included in the central unit of the donor node 401 include protocol stacks serving the control plane, including an RRC protocol layer and a PDCP layer. and protocol stacks serving the user plane, including a SDAP layer and a PDCP layer. The protocol stacks included in the distributed unit of the donor node 401 or the distributed unit portion of the relay node (402, or 403) include: protocol stacks serving the control plane and the user plane, including an RLC protocol layer, a MAC protocol layer, and a physical PHY layer. An interface between the central unit of the donor node 401 and the distributed unit of the donor node 401, and between the central unit of the donor node 401 and the distributed unit portion of the relay node is an F1 interface.

In the relay network, a link between the relay node and the donor node 401 or the distributed unit of the donor node 401 or between the relay nodes (between the relay node 1 and the relay node 2) is a backhaul link, one which or more different backhaul link channels will be set up. A backhaul link channel 1 (407) and a backhaul link channel 2 (408) are illustrated in FIG. 4. An example of the backhaul link channel is a backhaul link RLC channel, that is, a backhaul RLC channel In a relay network, each backhaul link channel is used to send data packets belonging to a same user or different users. The data packet may be a data packet of a user DRB a data packet of a user SRB, a data packet of the control plane on the F1 interface, a data packet of the user plane on the F1 interface, or a data packet of a non-F1 interface (e.g., an Internet protocol security (IPSec) data packet, an SCTP protocol data packet, an operation administration and maintenance (OAM) data packet, etc.).

To implement transmission of data of a UE in the multi-hop relay network, 3GPP defines a new protocol layer, that is, a backhaul adaptation protocol (BAP) layers configured in the distributed unit of the donor node 401 and the relay node (e.g., the mobile terminal portion of the relay node, and/or the distributed unit portion of the relay node), be located above the RLC layer, and has a main function of routing of data packets and mapping of data packets. To transmit data of the UE between the relay node and the donor node 401, it is necessary to complete a configuration of the backhaul link and a configuration of the F1 interface between the distributed unit portion of the relay node and the donor node 401. These configurations include but are not limited to a BAP address, a route configuration (e.g., routing identity information, the information indicates different transmission routes, and includes a BAP address and a path identity of a target receiving node), a configuration of the backhaul link channel, a configuration of a tunnel, and a backhaul link configuration with respect to the tunnel.

After NR is introduced into the relay network, the scenario where the relay node is stationary is mainly considered. However, with the further development of research, the latest research has begun to consider the movement of the relay node. In the process of moving, the relay node needs to change the connected donor node (anchor node) frequently. As multiple user equipment may have accessed under the relay node, such movement may inevitably lead to great signalling overhead and interrupt the data transmission of the user equipment. In addition, in the process of moving, there may be no direct interface between the donor nodes (anchor nodes) that the relay node may access, which may also lead to the interruption of data transmission of the user equipment, because the traditional technology cannot well support the handover of a relay node between two donor nodes (anchor nodes) without direct interface. This is one of the technical problems that the present disclosure wants to solve, that is, how to support the handover of the relay node between two donor nodes (anchor nodes) without direct interface in the moving process of the relay node. Another technical problem intended to be solved by the present disclosure is how to ensure continuous data transmission of the distributed unit portion of the relay node and the central unit of the connected donor node (anchor node).

Before introducing specific contents, some assumptions and some definitions of the present disclosure are given below.

The message names in the present disclosure are just examples, and other message names may also be used.

The "first", "second" and the like included in the message names of the present disclosure are only used to distinguish one message from another, and do not represent the execution order.

Detailed descriptions of steps irrelevant to the present disclosure are omitted in the present disclosure.

In the present disclosure, the steps in respective processes may be executed in combination with each other or may also be executed separately. The execution steps of respective processes are only examples, and other possible execution steps and/or orders are not excluded.

In the present disclosure, the base station may be a 5G base station (e.g., a gNB, a ng-eNB), or may also be a 4G base station (e.g., an eNB), or may also be other types of access nodes.

In the present disclosure, the transmission of data refers to the receiving or transmitting of the data.

In the present disclosure, uplink data refers to data sent by the relay node to the base station (the donor node), and downlink data refers to data sent by the base station (the donor node) to the relay node.

In the present disclosure, a structure of the relay node referred to in the schematic illustration includes a mobile terminal portion and a distributed unit portion; and the interface between the distributed unit portion of the relay node and the donor node (or the central unit of the donor node) is the F1 interface. However, the solution of the present disclosure is also applicable to relay nodes of other structures. In one embodiment, another possible structure of the relay node is one that includes a mobile terminal portion and a base station portion; and an interface between the base station portion and the donor node (or the central unit of the donor node) is an Xn/X2 interface.

In the present disclosure, "handover" and "migration" have the same meaning, i.e., the base station to which a node or user equipment is connected has changed, such as changed from a source base station to a target base station.

In the present disclosure, the base station to which the relay node is connected is called a donor node (anchor node), e.g., a source donor node (anchor node), or a target donor node (anchor node). The donor node (anchor node) may be a central unit of the base station, a control plane portion of the central unit of the base station, or a user plane portion of the central unit of the base station. However, the donor node (anchor node) is only a possible node name, and other possible names can be employed.

The following describes the first through twelfth nodes involved in the present disclosure.

The first node is a relay node and includes a first portion used for the relay node to access the network and referred to as a first entity of the first node, and a second portion used for serving another UE, and referred to as a second entity of the first node. The relay node is an IAB node and includes a mobile terminal (MT) portion and a DU portion. Thus, the first entity of the first node is the MT portion, and the second entity of the first node is the DU portion. Alternatively, the relay has the function of a BS including an MT portion and a BS portion. Thus, the first entity of the first node is the MT portion, and the second entity of the first node is the BS portion.

The second node, which is a BS a central unit of the BS, or a control plane portion of the central unit of the BS, is a node to which the first node is connected. The second node establishes an RRC connection with the first node (or the first entity of the first node). Alternatively, the second node establishes an interface (e.g., an F1 interface, an Xn/X2 interface) with the first node (the second entity of the first node), or establishes both an interface and an RRC connection with the first node. Specifically, the second node may be a donor node (anchor node) of the first node or may have the function of a donor node (anchor node).

The third node, which is a BS, a central unit of the BS, or a control plane portion of the central unit of the BS, is a node to which the first node is connected. The third node establishes an RRC connection with the first node (or the first entity of the first node), establishes an interface (e.g., an F1 interface, an Xn/X2 interface) with the first node (the second entity of the first node), or establishes both an interface and an RRC connection with the first node. Specifically, the third node may be a donor node (anchor node) of the first node, or may have the function of a donor node (anchor node).

The second node and the third node may be different nodes. For example, the second node is a source donor node (anchor node) to which the first node is connected in the process of moving, and the third node is a target donor node (anchor node) to which the first node is connected in the process of moving.

The fourth node is a mobility management entity such as the AMF or the MME. Specifically, the fourth node may be a source-side mobility management entity to which the first node is connected before moving.

The fifth node is a mobility management entity such as the AMF or the MME. Specifically, the fifth node may be a target-side mobility management entity to which the first node is connected after moving.

The sixth node is a session management entity such as a session management function (SMF). Specifically, the sixth node may be a source session management entity to which the first node is connected before moving.

The seventh node is an SMF. Specifically, the seventh node may be a target session management entity to which the first node is connected after moving.

The eighth node is a user plane function entity such as a user plane function (UPF). Specifically, the eighth node may be a source UPF entity to which the first node is connected before moving.

The ninth node is a UPF. Specifically, the ninth node may be a target UPF entity to which the first node is connected after moving.

The tenth node is a user plane portion of a central unit of a source donor node (anchor node) to which the first node is connected before moving.

The eleventh node is a user plane portion of a central unit of a target donor node (anchor node) to which the first node is connected after moving.

The twelfth node is a distributed unit (a source donor node DU) of a source donor node (anchor node) to which the first node connected before moving or is a distributed unit (a target donor node DU) of a target donor node (anchor node) to which the first node connected after moving.

Herein, taking the first node being an IAB node as an example, the interface established by the second entity of the first node is an F1 interface. However, the disclosure is applicable to other types of relay nodes, and the following description regarding the F1 interface is also applicable to other types of interfaces established by the second entity of the first node with the second node/third node.

Data Transmission

In the movement process of a relay node, there may be no direct interface (e.g., an XnAP interface) between a source donor node (anchor node) and a target donor node (anchor node) to which the relay node is connected, so the migration/handover of the relay node and the handover of UE accessing the relay node cannot be performed based on the signaling on a direct interface between the source donor node (anchor node) and the target donor node (anchor node). Conventionally, the handover/migration of a mobile terminal portion of the relay node and all UEs accessing the relay node needs to be implemented by means of signaling interaction on the interface between the source/target donor node (anchor node) and a core network (one implementation of the handover/migration in this manner is a handover based on a NG interface; The handover based on the NG interface is used herein, but the content in the present disclosure is applicable to the handover/migration of the relay node as well as the UE accessing the relay node based on other types of interfaces with the core network). In this process, if all UEs accessing a relay node have not completely handed over to the target donor node (anchor node) when the mobile terminal portion of the relay node hands over to the target donor node (anchor node), interruption of the data transmission of the UE may occur. Thus, this data transmission aspect of the disclosure overcomes the interruption of data transmission of the UE caused when the relay node performs a migration based on the NG interface.

After the relay node accesses the target donor node (anchor node), the distributed unit portion of the relay node maintains the connection with the source donor node (anchor node), and the data on the interface between the distributed unit portion and the source donor node (anchor node) is forwarded through the core network. Specifically, downlink data on the interface between the distributed unit portion of the relay node and the source donor node (anchor node) can be sent from the source donor node (anchor node) to the target donor node (anchor node) via the core network, and then sent by the target donor node (anchor node) to the relay node. Uplink data on an interface between the distributed unit portion of the relay node and the source donor node (anchor node) can be sent from the relay node to the target donor node (anchor node), and then from the target donor node (anchor node) to the source donor node (anchor node) via the core network.

Figure 5:
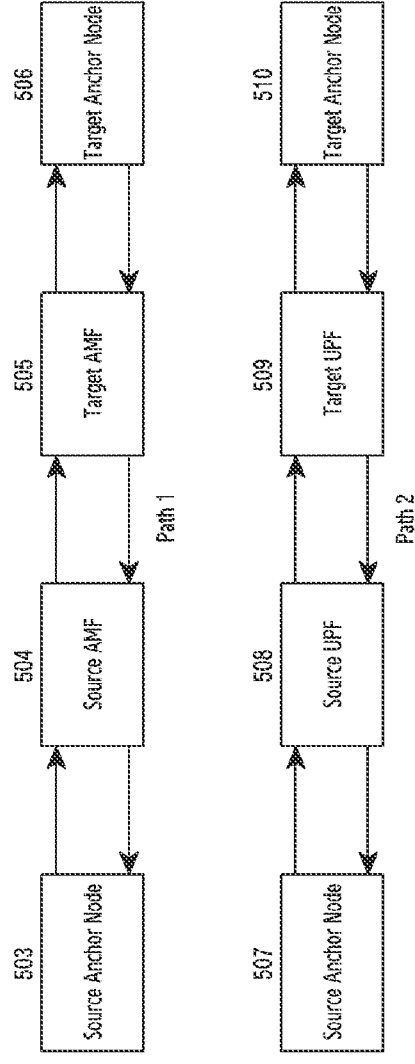
FIG. 5 illustrates a data transmission path according to an embodiment.

FIG. 5 illustrates a data transmission path according to an embodiment.

As illustrated in FIG. 5, such forwarding of data in the core network may be performed through paths 1 and 2.

Path 1, i.e., a source donor node (anchor node) 503 (or a central unit, or a control plane portion of the central unit)-a source AMF 504-a target AMF 505-a target donor node (anchor node) 506 (or a central unit, or a control plane portion of the central unit), is based on control plane entities. The source AMF 504 and the target AMF 505 above may be the same entity, or different entities. The path is only used for transmitting the signaling of the control plane. Alternatively, the path is used for both forwarding of the control plane signaling and forwarding of the user plane data.

Path 2, i.e., a source donor node (anchor node) 507 (or a central unit, or a user plane portion of the central unit)-a source UPF 508-a target UPF 509-a target donor node (anchor node) 510 (or a central unit, or a user plane portion of the central unit), is based on user plane entities. The source UPF 508 and the target UPF 509 above may be the same or different entities. The path 2 is only used for forwarding of the user plane data. To configure the path, the AMF and the SMF are required.

To implement the data forwarding based on paths 1 and 2, signaling interaction between the source donor node (anchor node), the core network node and the target donor node (anchor node) is required.

Figure 6:
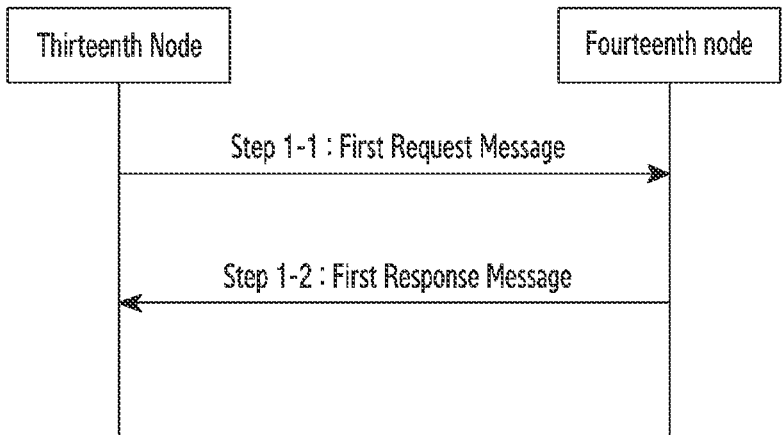
FIG. 6 illustrates a method of interaction between network nodes according to an embodiment.

FIG. 6 illustrates a method of interaction between network nodes according to an embodiment. The specific signalling interaction process may include the following steps, as shown in FIG. 6:

In step 1-1, a first message is sent from a thirteenth node to a fourteenth node. The first message may be a first request message for providing a configuration obtained from the thirteenth node side and for forwarding the data on an interface between a first node and the source donor node (anchor node). The message may include at least one of the following information.

First identity information identifying the first node, such as an AMF UE NGAP ID, a RAN UE NGAP ID, and an SMF UE ID.

First data information including information of the forwarded data, wherein the information may include at least one of the following pieces of information.

Target identity information, which identifies a target node for receiving data. The data included in the "data packet information" below may be sent from the thirteenth node to the fourteenth node, and if the fourteenth node is not the target node, then the fourteenth node is an intermediate node that needs to pass through for delivering data to the target node. When the data is sent to the target donor node (anchor node) so as to be forwarded to the first node, the target node denotes the target donor node (anchor node). When the data is forwarded to the source donor node (anchor node), the target node denotes the source donor node (anchor node). The information may include at least one of identity information of the target node, such as a global RAN node ID, and identity information of a tracking area, such as a tracking area identity.

Data packet information, including a data packet of an interface (e.g., F1 interface) between the first node and the source donor node (anchor node) which needs to be forwarded. The data packet may include control plane signaling (e.g., F1-C signaling) on the interface (e.g., F1 interface) between the first node and the source donor node (anchor node). Or the data packet (e.g., an F1-U data packet) may include user plane data on the interface (e.g., F1 interface) between the first node and the source donor node (anchor node). The data packet included in the above data packet information may be in the form of an IP packet, an SCTP/GTP-U packet, or an F1-C message, or an RRC message including the F1-C message signaling.

Data packet configuration information indicating configuration information, related to the data packet included in the above data packet information, and including at least one of:

first address information indicating an address of a first endpoint used for receiving the data packet on the interface between the first node and the source donor node (anchor node) (the first endpoint is the first node or the source donor node (anchor node)), such as an IP address, first port information, indicating a port used on the interface between the first node and the source donor node (anchor node), the information being port information of a SCTP, and first endpoint identity information, indicating an endpoint of a tunnel used on the interface between the first node and the source donor node (anchor node), the information being identify information of an endpoint of a GTP-U tunnel (a tunnel endpoint identity).

The first data information includes data on the interface between the first node and the source donor node (anchor node), which has the beneficial effects that the control plane signaling or user plane data on the interface between the first node and the source donor node (anchor node) can be forwarded through the first request message (e.g., the control plane signaling), thus avoiding the process of configuring other nodes of the core network.

First forwarding information, indicating node configuration information for receiving and/or sending the forwarded data which may be uplink data (from the first node to the source donor node (anchor node)), or downlink data (from the source donor node (anchor node) to the first node). The received data may be sent by the source donor node (anchor node), or may be sent by the source UPF, or may be sent by the target UPF, or may be sent by the target donor node (anchor node). If the sending nodes are different, the configuration for receiving data included in the information may also be different. The information may include at least one of the following information.

Data identity information, indicating the forwarded data, wherein the data may be on one or more tunnels on the interface between the first node and the source donor node (anchor node), or data of one or more transport layer associations, the information may include at least one of the following information:

Traffic identity information, such as a traffic identity (Traffic ID), a traffic index (Traffic Index), Identity information of backhaul link information, such as a backhaul link information index, wherein the information denotes the configuration of the backhaul link of the forwarded data (e.g., a backhaul link channel, routing identity information, etc.). For example, when the identity information of the backhaul link information is equal to 1, the information denotes a configuration 1 of the backhaul link of the forwarded data (i.e., the backhaul link channel is the backhaul link channel 1, and the routing identity information is the routing identity information 1); and when the identity information of the backhaul link information is equal to 2, the information denotes a configuration 2 of the backhaul link of the forwarded data (i.e., the backhaul link channel is a backhaul link channel 2, and the route identity information is the route identity information 2), Address information included in the forwarded data, such as a destination IP address, and a source IP address, Identity information of a PDU session, Identity information of a QoS flow, Identity information of a DRB, Identity information of a tunnel, and Identity information of a transport layer association.

First configuration information used by the forwarded data on the interface between the first node and the source donor node (anchor node), wherein the information may include at least one of the following information:

Third address information, indicating an address of a first endpoint used for receiving the data on the interface between the first node and the source donor node (anchor node) (the first endpoint is the first node or the source donor node (anchor node)), such as an IP address, Third port information, indicating a port used on the interface between the first node and the source donor node (anchor node), the information may be the port information of an SCTP, Third endpoint identity information, indicating an endpoint of a tunnel used on the interface between the first node and the source donor node (anchor node), the information may be identity information of an endpoint of a GTP-U tunnel (a tunnel endpoint identity).

Second configuration information, indicating information of a receiving endpoint (i.e., a second endpoint) used when forwarding the data on the interface between the first node and the source donor node (anchor node), wherein the second endpoint may be either the source donor node (anchor node), the source UPF, the target UPF or the target donor node (anchor node). The information may include at least one of the following information:

Second address information, indicating an address of an endpoint used by the second endpoint for receiving the data, such as an IP address, Second port information, indicating a port used by the second endpoint for receiving data, the information being port information of an SCTP, and Second endpoint identity information, indicating an endpoint of a tunnel used by the second endpoint for receiving data, the information being identity information of an endpoint of a GTP-U tunnel (a tunnel endpoint Identity).

The above first forwarding information implements a new data forwarding mode, through which the forwarding is performed according to traffic transmitted between the first node and the source donor node (anchor node). This traffic can be represented by the identity information of the traffic and/or the identity information and/or address information of the backhaul link information, etc., while the forwarded data are data packets on the interface between the first node and the source donor node (anchor node). The beneficial effects are that after receiving these data packets, the target donor node (anchor node) can forward these data packets directly without further processing, since the target donor node (anchor node) knows that the final processing of these packets should be handed over to the first node or the source donor node (anchor node), so that the processing complexity of the target donor node (anchor node) can be reduced. The forwarding of the data on the interface between the first node and the source donor node (anchor node) between the source donor node (anchor node) and the target donor node (anchor node) without a direct interface is achieved, and the interruption of data transmission of the UE served by the first node caused by the migration process of the first node is avoided.

It should be noted that the information given by the first configuration information and the second configuration information may be different types of information. For example, the second configuration information is used for receiving data having the configuration information given by the first configuration information. Specifically, when the second configuration information is used for data forwarding, the forwarded data may include the configuration information given by the first configuration information. In one example, the forwarded data is data on an F1 interface between the first node and the source donor node (anchor node) (e.g. data on the F1-C interface, or data on the F1-U interface), thus the first configuration information indicates configuration information of a tunnel on the F1 interface (F1-U) (e.g., the first address information and configuration information of a tunnel indicated by the first endpoint identity information in the above first configuration information), or configuration information of an (F1-C) transport layer association (e.g., the first address information and configuration information of a transport layer association indicated by the first port information in the above first configuration information), while the second configuration information is used by the nodes (e.g., the source donor node (anchor node), source UPF, source AMF, target donor node (anchor node), target AMF, and target UPF) for receiving the data on these F1 interfaces. Thus, the forwarded data is a data packet including the above configuration information of the tunnel on the F1-U interface, or a data packet including the above configuration information of the transport layer association on the F1-C interface.

In step 1-2, a second message is sent from the fourteenth node to the thirteenth node. The second message may be a first response message, the message has a main function of providing a configuration obtained from the fourteenth node side and for performing data forwarding on an interface between the first node and the source donor node (anchor node). The message may include at least one of the following information.

Second identity information identifying the first node, e.g., an AMF UE NGAP ID, a RAN UE NGAP ID, and an SFM UE ID, Second data information of the forwarded data, wherein the description of the information refers to the above first data information. The data packet configuration information included in the second data information may further include configuration information of an IP header of the data packet, such as configuration information of a differentiated services code point (DSCP) and the configuration information of a flow label, and Second forwarding information indicating node configuration information for receiving and/or transmitting forwarded data, wherein the forwarded data may be uplink data (from the first node to the source donor node (anchor node)) or downlink data (from the source donor node (anchor node) to the first node). The content included in the information is listed above in the first forwarding information.

The thirteenth and fourteenth nodes involved in the above process may respectively be a source donor node (anchor node) (the second node) and a source AMF (the fourth node), in which case, the first forwarding information included in above step 1-1 is directed to information on the source donor node (anchor node) side, and is used for indicating configuration information used by the source donor node (anchor node) when receiving uplink data on the interface between the first node and the source donor node (anchor node) (the uplink data may be sent to the source donor node (anchor node)). The second forwarding information included in step 1-2 aims at information of the source UPF and is used for indicating configuration information used by the source UPF when receiving downlink data (the downlink data may be sent to the source UPF) on the interface between the first node and the source donor node (anchor node).

a source AMF (the fourth node) and a source SMF (the sixth node), in which case, the first forwarding information included in above step 1-1 is directed to information of the source donor node (anchor node), and is used for indicating configuration information used by the source donor node (anchor node) when receiving uplink data on the interface between the first node and the source donor node (anchor node) (the uplink data may be sent to the source donor node (anchor node)). The second forwarding information included in step 1-2 aims at information of the source UPF, is used for indicating the configuration information used by the source UPF when receiving downlink data sent to the source UPF), which is sent by the source donor node (anchor node), on the interface between the first node and the source donor node (anchor node), or for indicating the configuration information used by the source UPF when receiving the uplink data (the uplink data is sent from the target UPF or the target donor node (anchor node) to the source UPF), which is sent by other nodes (e.g., the target UPF, the target donor node (anchor node)), on the interface between the first node and the source donor node (anchor node).

a source SMF (the sixth node) and a source UPF (the eighth node), in which case, the above first forwarding information included in above step 1-1 is directed to information of the source donor node (anchor node), and is used for indicating configuration information used by the source donor node (anchor node) when receiving uplink data (the uplink data may be sent to the source donor node (anchor node)), which is sent by the source UPF, on the interface between the first node and the source donor node (anchor node). The second forwarding information included in step 1-2 aims at information of the source UPF, is used for indicating the configuration information used by the source UPF when receiving downlink data (the downlink data may be sent to the source UPF), which is sent by the source donor node (anchor node), on the interface between the first node and the source donor node (anchor node), or for indicating the configuration information used by the source UPF when receiving uplink data (the uplink data is sent from the target UPF or the target donor node (anchor node) to the source UPF), which is sent by other nodes (e.g., the target UPF, the target donor node (anchor node)), on the interface between the first node and the source donor node (anchor node).

if the source donor node (anchor node) and the target donor node (anchor node) are connected to different AMFs, the thirteenth node and the fourteenth node are the source AMF (the fourth node) and the target AMF (the fifth node), respectively.

In this case, the first forwarding information included in above step 1-1 is directed to information of the source UPF and is used for indicating configuration information used by the source UPF when receiving uplink data (the uplink data may be sent to the source UPF) on the interface between the first node and the source donor node (anchor node). The second forwarding information included in step 1-2 aims at information of the target UPF and is used for indicating configuration information used by the target UPF when receiving downlink data (the downlink data may be sent to the target UPF), which is sent by the source UPF, on the interface between the first node and the source donor node (anchor node).

a target AMF (the fifth node) and a target donor node (anchor node) (the third node), in which case, the first forwarding information included in above step 1-1 is directed to information of the target UPF, and is used for indicating configuration information used by the target UPF when receiving uplink data (the uplink data may be sent to the target UPF) on the interface between the first node and the source donor node (anchor node). The second forwarding information included in step 1-2 aims at information of the target donor node (anchor node) and is used for indicating configuration information used by the target donor node (anchor node) when receiving downlink data (the downlink data may be sent to the target donor node (anchor node)) on the interface between the first node and the source donor node (anchor node).

a target AMF (the fifth node) and a target SMF (the seventh node), in which case, the first forwarding information included in above step 1-1 is directed to information of the target donor node (anchor node), and is used for indicating configuration information used by the target donor node (anchor node) when receiving the downlink data (the downlink data may be sent to the target donor node (anchor node)) on the interface between the first node and the source donor node (anchor node). The second forwarding information included in step 1-2 aims at information of the target UPF, is used for indicating the configuration information used by the target UPF when receiving unlink data (the uplink data may be sent to the target UPF), which is sent by the target donor node (anchor node), on the interface between the first node and the source donor node (anchor node), or for indicating the configuration information used by the target UPF when receiving downlink data (the downlink data is sent from the source UPF to the target UPF), which is sent by other nodes (e.g., the source UPF, the source donor node (anchor node)), on an interface between the first node and the source donor node (anchor node).

a target SMF (the seventh node) and a target UPF (the ninth node), in which case, the first forwarding information included in above step 1-1 is directed to information of the target donor node (anchor node), and is used for indicating configuration information used by the target donor node (anchor node) when receiving downlink data (the downlink data may be sent to the target donor node (anchor node)) on the interface between the first node and the source donor node (anchor node). The second forwarding information included in step 1-2 aims at information of the target UPF, is used for indicating the configuration information used by the target UPF when receiving unlink data (the uplink data may be sent to the target UPF), which is sent by the target donor node (anchor node), on the interface between the first node and the source donor node (anchor node), or for indicating the configuration information used by the target UPF when receiving downlink data (the downlink data is sent from the source UPF to the target UPF), which is sent by other nodes (e.g., the source UPF, or the source donor node (anchor node)), on an interface between the first node and the source donor node (anchor node).

a control plane portion of a central unit of a source donor node (anchor node) (the second node) and a user plane portion of the central unit of the source donor node (anchor node) (the tenth node), in which case, the first forwarding information included in above step 1-1 is directed to information of the source UPF and is used for indicating configuration information used by the source UPF when receiving downlink data (the downlink data may be sent to the source UPF) on the interface between the first node and the source donor node (anchor node). The second forwarding information included in step 1-2 aims at information of the user plane portion of the central unit of the source donor node (anchor node), and is used for indicating configuration information used by the user plane portion of the central unit of the source donor node (anchor node) when receiving uplink data (the uplink data may be sent to the user plane portion of the central unit of the source donor node (anchor node)) on the interface between the first node and the source donor node (anchor node).

a control plane portion of a central unit of a target donor node (anchor node) (the third node) and a user plane portion of the central unit of the target donor node (anchor node) (the eleventh node), in which case, the first forwarding information included in above step 1-1 is directed to information of the target UPF, and is used for indicating configuration information used by the target UPF when receiving uplink data (the uplink data may be sent to the target UPF) on the interface between the first node and the source donor node (anchor node). The second forwarding information included in step 1-2 aims at information of the user plane portion of the central unit of the target donor node (anchor node), and is used for indicating configuration information used by the user plane portion of the central unit of the target donor node (anchor node) when receiving downlink data (the downlink data may be sent to the user plane portion of the central unit of the target donor node (anchor node)) on the interface between the first node and the source donor node (anchor node).

a control plane portion and/or a user plane portion of a central unit of a target donor node (anchor node) (the third node) and a distributed unit of the target donor node (anchor node) (the twelfth node), in which case, the first forwarding information included in step 1-1 is directed to information of (the control plane portion and/or user plane portion) of the central unit of the target donor node (anchor node), and is configuration information used when receiving uplink data (the uplink data may be sent to the central unit of the target donor node (anchor node), or the control plane portion and/or user plane portion of the central unit of the target donor node (anchor node)) on the interface between the first node and the source donor node (anchor node). The second forwarding information included in step 1-2 is directed to information of the distributed unit of the target donor node (anchor node), and is used for indicating configuration information used by the distributed unit of the target donor node (anchor node) when receiving downlink data (the downlink data may be sent to the distributed unit of the target donor node (anchor node)) on the interface between the first node and the source donor node (anchor node).

To implement data forwarding through the above path 1 or path 2, the included signaling interaction processes may be different.

Path 1 indicates a source donor node (anchor node) (or a central unit, or a control plane portion of the central unit)-a source AMF-a target AMF-a target donor node (anchor node) (or a central unit, or a control plane portion of the central unit).

In step 1-1-a, a first request message 1-a is sent from the source donor node (anchor node) to the source AMF.

In step 1-1-b, a first request message 1-b is sent from the source AMF to the target AMF.

In step 1-1-c, a first request message 1-c is sent from the target AMF to the target donor node (anchor node).

The above steps are used to configure for sending downlink data on the interface between the first node and the source donor node (anchor node).

In step 1-1-e, a first response message 1-e is sent from target donor node (anchor node) to the target AMF.

In step 1-1-f, a first response message 1-f is sent from target AMF to the source AMF.

In step 1-1-g, a first response message 1-g is sent from the source AMF to the source donor node (anchor node).

These steps are used to configure for sending uplink data on the interface between the first node and the source donor node (anchor node).

The description of the request messages in above respective steps can be referred to the description of the first request message in above step 1-1, and the description of the response messages in above respective steps can be referred to the description of the first response message in above step 1-2.

Path 2 indicates a source donor node (anchor node) (or a central unit, or a user plane portion of the central unit)-a source UPF-a target UPF-a target donor node (anchor node) (or a central unit, or a user plane portion of the central unit).

In step **1-2-*a*, a first request message 2-*a*** is sent from the source donor node (anchor node) to the source AMF.

In step **1-2-*b*, a first request message 2-*b*** is sent from the source AMF to the source SMF.

In step **1-2-*g*, a first request message 2-*g*** is sent from the target AMF to the target UPF.

In step **1-2-*c*, a first request message 2-*c*** is sent from the source SMF to the source SMF.

In step **1-2-*d*, a first response message 2-*d*** is sent from the source UPF to the source AMF.

In step **1-2-*e*, a first response message 2-*e*** is sent from the source SMF to the source AMF.

In step **1-2-*f*, a first request message 2-*f*** is sent from source AMF to the target SMF.

In step **1-2-*h*, a first request message 2-*h*** is sent from the target SMF to the target UPF.

In step **1-2-*i*, a first response message 2-*i*** is sent from the target UPF to the target SMF.

In step **1-2-*j*, a first response message 2-*j*** is sent from the target SMF to the target AMF.

In step **1-2-*k*, a first request message 2-*k*** is sent from the target AMF to the target donor node (anchor node).

In step 1-2-1, a first response message 2-1 is sent from the target donor node (anchor node) to the target AMF.

In step **1-2-*m*, a first request message 2-*m*** is sent from the target AMF to the target SMF.

In step **1-2-*n*, a first request message 2-*n*** is sent from the target SMF to the target UPF.

In step **1-2-*o*, a first response message 2-*o*** is sent from the target UPF to the target SMF.

In step **1-2-*p*, a first response message 2-*p*** is sent from target SMF to the target AMF.

In step **1-2-*q*, a first response message 2-*q*** is sent from target AMF to the source AMF.

In step **1-2-*r*, a first request message 2-*r*** is sent from the source AMF to the source SMF.

In step **1-2-*s*, a first request message 2-*s*** is sent from the source SMF to the source UPF.

In step **1-2-*t*, a first response message 2-*t*** is sent from the source UPF to the source SMF.

In step **1-2-*u*, a first response message 2-*u*** is sent from the source SMF to the source AMF.

In step **1-2-*v*, a first response message 2-*v*** is sent from source AMF to the source donor node (anchor node).

When an IP address included in the data packet of the forwarded data is further an IP address associated with the source donor node (anchor node), the following In steps are further included.

In step **1-2-*w*, a first request message 2-*w* is sent from the central unit of the target donor node (anchor node) to the distributed unit of the target donor node (anchor node), and In step 1-2-*x*, a first response message 2-*x*** is sent from the distributed unit of the target donor node (anchor node) to the central unit of the target donor node (anchor node).

The execution order of above steps is just an example, and other orders may also be employed in other examples.

The above description of the request messages relates to the description of the first request message in above step 1-1, and the description of the response messages relates to the description of the first response message in above step 1-2.

The messages may be a message of a NG interface, or a message of a N4 interface, or a Namf message, or a Nsmf message. When the thirteenth node and the fourteenth node above are respectively the source donor node (anchor node) and the source AMF, the first request message and the first response message may be respectively a Handover Required message and a Handover Command message, for example.

When the thirteenth node and the fourteenth node above are respectively the target donor node (anchor node) and the target AMF, the first request message and the first response message may respectively be a Handover Request message and a Handover Request Acknowledge message, for example.

The signaling interaction flow defined in above steps 1-1 and 1-2 has the beneficial effect that a forward path between the source donor node (anchor node) and the target donor node (anchor node) for forwarding the data on the interface between the first node and the source donor node (anchor node) can be configured, so as to avoid occurrence of interruption of data transmission during the handover of the first node.

Reduction of Group Handover Signaling Overhead

In the moving process of the relay node, the UE accessing the relay node also needs to be handed over, also referred to as group handover or group mobility. This leads to the handover of multiple UEs in a short time period, which increases signaling interaction on interfaces, such as an XnAP interface, an F1 interface, and an air interface. This may increase the load of the interface, and also causes latency of the handover of the UE. This aspect of the disclosure is directed to reducing the signaling overhead in the group handover process and reducing the latency of the UE during group handover.

The distributed unit portion of the relay node does not need to wait for the service-related information of the UE sent by the target donor node (anchor node) during the group handover, so that the relay node can perform access control and resource allocation for the UE in advance. In particular, the disclosure teaches that during the group handover, the relay node performs access control and resource allocation in advance based on the service information of the UE, thereby reducing the signaling interaction overhead between the donor nodes (anchor nodes) and the signaling overhead between the donor node (anchor node) and the relay node.

Methods 1 and 2 are disclosed to implement the solution.

In method 1, new configuration information is sent from the relay node to the source donor node (anchor node).

Figure 7:
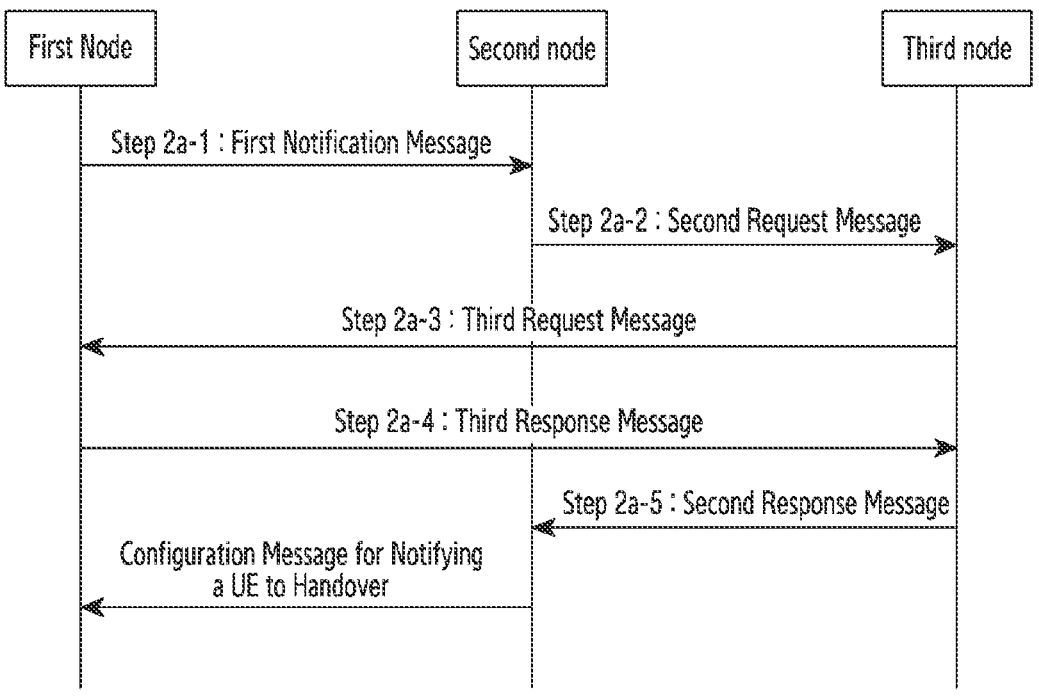
FIG. 7 illustrates a method of interaction between nodes according to an embodiment.

FIG. 7 illustrates a method of interaction between nodes according to an embodiment.

In method 1, the relay node is configured to determine the services of the UE which is accepted by the relay node according to a target cell to which the relay node accesses (or may access), and then to send configuration information for serving these services to the source donor node (anchor node). Thereafter, the source donor node (anchor node) determines a signaling interaction with the target donor node (anchor node) according to the obtained configuration information.

In step **2*a*-1**, a third message is sent from a first node to a second node. The third message may be a first notification message which serves to inform configuration information for serving the service of the UE at the first node. After receiving the message, the second node may determine configuration information of the UE to be sent to the third node, thus reducing the sending of unnecessary configuration information. In one example, the message may include configuration information of one or more UE. For one UE, the message may include at least one of the following pieces of information.

First identity information of a UE, which may include at least one piece of the following information:

Identity information of the UE when accessing the source donor node (anchor node), e.g., a CU/DU UE F1AP ID, Identity information of the UE when accessing the target donor node (anchor node), e.g., a DU UE F1AP ID, First identity information of an associated cell, wherein the associated cell indicated by the information is a cell accessed by the first node and served by the third node; The information serves to inform the second node that configuration information included in the following first configuration information of the user service is valid only when the first node accesses the associated cell, and First configuration information of a user service, which indicates configuration information of the service of the UE served the first node after accessing the third node, wherein the information may include at least one of the following information.

First identity information of a serving cell, including identifiers of one or more cells serving the UE, wherein the cell at least includes a primary cell, optionally, may additionally include one or more secondary cells. These cells are cells serving the UE after the first node accesses the third node, First information related to a radio bearer, which may be a data radio bearer, or a signaling radio bearer; The radio bearer is one or more radio bearers accepted by the first node. Alternatively, the radio bearer is one or more radio bearers that cannot be accepted by the first node. For one radio bearer, the information includes identity information of the radio bearer. According to the information, the second node can obtain the service information that the first node can serve the UE after accessing the third node, such as a radio bearer (or a PDU session corresponding to the radio bearer, or a QoS flow corresponding to the radio bearer), and First resource configuration information, including resource configuration information for serving the UE at the first node side, wherein the information may include an RLC layer configuration, a MAC layer configuration, and a physical layer configuration. For further details, CellGroupConfig in TS38.331 or DU to CU RRC Information in TS38.473 may be referenced.

In step 2a-1, configuration information for serving the UE after the first node accesses the third node is provided. In an implementation, a distributed unit portion (e.g., a distributed unit portion 1) used by the first node when accessing the second node is different from a distributed unit portion (e.g., a distributed unit portion 2) used by the first node when accessing the third node, the second node establishes an interface with the distributed unit portion 1, the third node establishes an interface with the distributed unit portion 2, and then step 2a-1 includes sending the configuration information for serving the UE by the distributed unit portion 2 to the second node. Pursuant to this step, the second node can obtain the configuration information of each UE served by the first node after accessing the third node, and the information may help the second node determine the configuration information about the UE to be sent to the third node. For example, after obtaining the service (e.g., a radio bearer) of the UE that can be served by the first node through step 2a-1, the second node may only provide information of the services can be accepted by the first node to the third node (e.g., information of a PDU session, QoS flow information, and radio bearer information). Further pursuant to this step, as the first node has informed the second node of the configuration information for serving the UE generated by the first node after accessing the third node (e.g., the first resource configuration information), the second node no longer needs to provide the third node with the configuration information for serving the UE generated by the first node when accessing the second node (e.g., the configuration information of the distributed unit portion 1). These two beneficial effects can reduce the overhead of signaling interaction between the second node and the third node.

In step 2a-2, a fourth message is sent from the second node to the third node. The fourth message may be a second request message, the function of which is to request the handover of one or more UE, and the one or more UE is the UE accessing the first node. For one UE, the content included in the message can be referred to the Handover Request message in TS38.423. In addition to that, the message may include at least one of the following information.

Second identity information of a UE, which is identity information of the UE when accessing the target donor node (anchor node), such as a DU UE F1AP ID, Second identity information of an associated cell, wherein the associated cell indicated by the information is a cell accessed by the first node and served by the third node. The information serves to inform the third node that the configuration information included in the following second configuration information of the user service is valid only when the first node accesses the associated cell, Second configuration information of a user service, wherein the information, in addition to the configuration information of the service of the UE included in the existing Handover Request message (the information may only include the information of the service of the UE accepted by the first node, or, the information may not include the configuration information on the first node side, e.g., the configuration information included in CellGroupConfig), may further include at least one of the following information.

Second identity information of a serving cell, wherein the information includes identifiers of one or more cells serving the UE, and the cell at least includes a primary cell, optionally, the cell may additionally include one or more secondary cells. These cells are the cells serving the UE after the first node accesses the third node, Second information related to a radio bearer, wherein the radio bearer is a radio bearer that can be accepted after the first node accessing the third node. The information may help the third node obtain a correspondence between the radio bearer used by the first node when serving the UE and the services of the UE (e.g., a PDU session, and a QoS flow), and also obtain a configuration of QoS parameters of the radio bearer. The information may include at least one of the following information:

Identity information of the radio bearer,

QoS information of the radio bearer,

Identity information of the QoS flow, indicating a QoS flow served by the radio bearer, and Identity information of the PDU session.

In step **2*a*-3**, a fifth message is sent from the third node to the first node. The fifth message may be a third request message, which serves to setup the context of the UE on the interface between the first node and the third node, the message may include configuration information of one or more UE. For one UE, the message may include at least one of the following information.

Third identity information of a UE, which is identity information of the UE when accessing the target donor node (anchor node), such as a CU/DU UE F1AP ID, Third identity information of an associated cell, wherein the associated cell indicated by the information is a cell accessed by the first node and served by the third node. The information serves to inform the first node that the configuration information included in the following third configuration information of a user service is valid only when the first node accesses the associated cell, Third configuration information of a user service, which may include at least one of the following information.

Third identity information of a serving cell, wherein the information includes identifiers of one or more cells serving the UE, and the cell at least includes a primary cell, optionally, may additionally include one or more secondary cells. These cells are the cells serving the UE after the first node accesses the third node, Third information related to a radio bearer, wherein the radio bearer is a radio bearer the first node can accept after accessing the third node. For a radio bearer, the information may include identity information of the radio bearer, configuration information of a tunnel for transmitting data of the UE on the third node side, such as a transport layer address, and tunnel port identity information, etc.

Step **2*a*-4**: Optionally, a sixth message is sent from the first node to the third node. The sixth message may be a third response message, which serves to provide configuration information of one or more UE on the first node side, and the configuration information is used for the first node to serve the UE after accessing the third node. For one UE, the message may include at least one of the following information.

Fourth identity information of the UE when accessing the target donor node (anchor node), such as a CU/DU UE F1AP ID, Fourth identity information of an associated cell, wherein the associated cell indicated by the information is a cell accessed by the first node and served by the third node. The information serves to inform the third node that the configuration information included in the following fourth configuration information of a user service is valid only when the first node accesses the associated cell, Fourth configuration information of a user service, which may include the following information.

Fourth information related to a radio bearer, wherein the radio bearer is a radio bearer that the first node can accept after accessing the third node. For a radio bearer, the information may include identity information of the radio bearer, configuration information of a tunnel for transmitting data of the UE on the first node side, such as a transport layer address, and tunnel port identity information, etc.

In step **2*a*-5**, a seventh message is sent from the third node to the second node. The seventh message may be a second response message, which serves to provide configuration information of one or more UE on the third node side, e.g., configuration information of a PDCP layer, configuration information of an SDAP layer, etc. In this step, the third node provides only part of configuration information of the UE, and then the second node composes a configuration message for notifying the UE to handover, and thus the overhead for sending the signaling from the third node to the second node can be reduced.

After step **2*a*-5**, optionally, the process further comprises sending the generated configuration message for notifying the UE to handover from the second node to the first node, and then from the first node to the UE.

Accordingly, only part of configuration information of the UE needs to be transmitted in steps **2*a*-2 to 2*a*-5**, thus reducing the signaling overhead between the interfaces and speeding up the handover of the UE.

In an example, the messages used in the foregoing steps may respectively be:

first notification message: UE Context Notification message second request message: Group handover request message third request message: Group UE context setup request message third response message: Group UE context setup response message second response message: Group handover response message configuration message for informing the UE to handover: Radio Resource Control (RRC) reconfiguration (RRCreconfiguration) message.

The above message names are just for examples, and other possible names can be used.

In method 2, New configuration information is sent from the relay node to the target donor node (anchor node).

Figure 8:
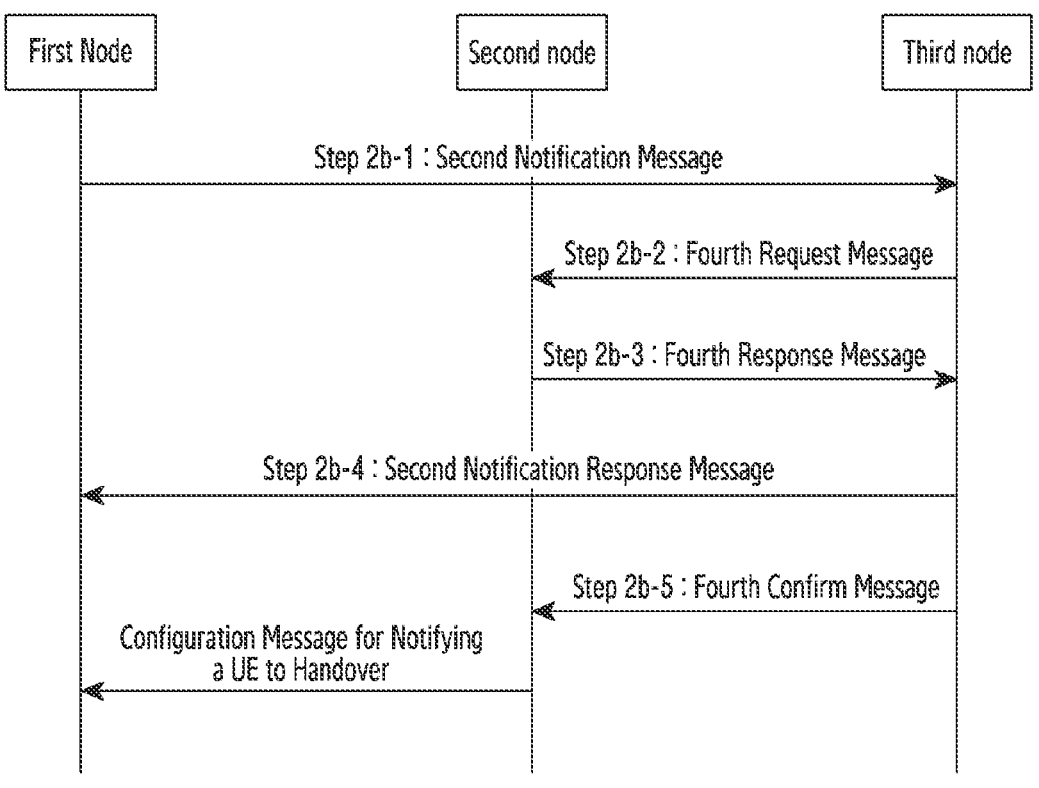
FIG. 8 illustrates a method of interaction between nodes according to an embodiment.

FIG. 8 is a method of interaction between nodes according to an embodiment. In method 2, the service of the UE that can be accepted is determined after the relay node accesses the target cell, and then the configuration information for serving these services is sent to the target donor node (anchor node). Thereafter, the target donor node (anchor node) requests the context of the UE according to the obtained configuration information. Method 2 may include the following steps.

In step **2*b*-1**, an eighth message is sent from the first node to the third node. The eighth message may be a second notification message which serves to inform configuration information for serving the service of the UE at the first node. After receiving the message, the third node can determine the context of the UE to be requested from the second node, thus avoiding unnecessary transmission of the context of the UE and saving signaling overhead. In one example, the message may include configuration information of one or more UE. For one UE, the message may include at least one of the following information.:

Fifth identity information of a UE, wherein the information may include at least one of the following information.

Identity information of the UE when accessing the source donor node (anchor node), such as a CU/DU UE F1AP ID, Identity information of the UE when accessing the target donor node (anchor node), such as a DU UE F1AP ID, Fifth identity information of an associated cell, wherein the associated cell indicated by the information is a cell accessed by the first node and served by the third node. The information serves to inform the third node that configuration information included in the following fifth configuration information of a user service is valid only when the first node accesses the associated cell, Fifth configuration information of a user service, indicating configuration information of the service of the UE served by the first node after accessing the third node, wherein the information may include at least one of the following information.

Fifth identity information of a serving cell, wherein the information includes identifiers of one or more cells serving the UE, and the cell at least includes a primary cell, optionally, may additionally include one or more secondary cells. These cells are the cells serving the UE after the first node accesses the third node.

Fifth information related to a radio bearer, wherein the bearer may be a data radio bearer, or a signaling radio bearer. The radio bearer is one or more radio bearers accepted by the first node. Alternatively, the radio bearer is one or more radio bearers that cannot be accepted by the first node. If there are multiple radio bearers, the fifth information related to the radio bearer of these radio bearers constitutes a list of fifth information related to the radio bearer. The information may include at least one of the following information.

Identity information of a radio bearer,

QoS information of the radio bearer,

Tunnel information serving the radio bearer on the first node side, such as a transport layer address, and the identity information of a tunnel endpoint, Information of a QoS flow, indicating a QoS flow served by the radio bearer, such as identification information of the QoS flow, QoS information of the QoS flow, and identity information of a PDU session, etc., and Fifth resource configuration information, including the resource configuration information for serving the UE on the first node side, wherein the information may include an RLC layer configuration, a MAC layer configuration and a physical layer configuration.

In method 2, the first node provides the third node the configuration information of the UE without the request of the third node, and the configuration information further includes more information related to the radio bearer of the UE and so on, e.g., QoS information of the radio bearer, information of a QoS flow served by the radio bearer, etc. The information can help the third node request the context information of the UE from the second node, thereby reducing the unnecessary transmission of information (e.g., the information of the service corresponding to the radio bearer that is not accepted by the first node does not need to be provided by the second node).

In step 2b-2, a ninth message is sent from the third node to the second node. The ninth message may be a fourth request message, which serves to request to acquire configuration information of one or more UE served by the first node at the second node. After receiving the message, the configuration information of the UE requested by the third node is sent from the second node to the third node, the advantage for doing this is reducing the unnecessary sending of the content of the UE and saving signaling overhead. For one UE, the message may include at least one of the following information.

Sixth identity information of a UE, which is identity information of the UE when accessing the source donor node (anchor node), such as a CU/DU UE F1AP ID, Sixth identity information of an associated cell, wherein the associated cell indicated by the information is a cell accessed by the first node and served by the third node. The information serves to inform the second node that the configuration information included in the following sixth configuration information of a user service is valid only when the first node accesses the associated cell, Sixth configuration information of a user service, which may include at least one of the following information.

Sixth identity information of a serving cell, which includes identifiers of one or more cells serving the UE, wherein the cell at least includes a primary cell, optionally, may additionally include one or more secondary cells. These cells are the cells serving the UE after the first node accesses the third node.

First information related to a service, which indicates a service accepted by the first node, such as identity information of a PDU session, and identity information of a QoS flow, etc. The second node, after receiving the information, may determine which configuration information of the UE service to be sent to the third node, such as which configuration information of PDU session/QoS flow to be sent to the third node.

The third node provides the second node with information related to the service of the UE, the information indicates information of the context that needs to be sent to the third node (it is unnecessary to send configuration information of those services that are not requested by the third node to the third node). This step reduces the amount of configuration information of the UE to be sent, i.e., the second node only needs to send part of the context of the UE to the third node.

In step 2b-3, a tenth message is sent from the second node to the third node. The tenth message may be a fourth response message, which serves to provide the third node with the context of the UE served by the first node, the message may include configuration information of one or more UE. For one UE, the content included in the message can be referred to the retrieve UE Context Response message in the standard. However, the content included in the fourth response message can be reduced rendering it unnecessary to include the configuration information on the first node side, and the configuration information is the configuration information used by the first node to serve the UE when accessing the second node.

In step 2b-4, an eleventh message is sent from the third node to the first node. The eleventh message may be a second notification response message, which serves to provide configuration information of one or more UE on the third node side, and the configuration information is used for the first node to serve the UE after accessing the third node. For one UE, the message may include at least one of the following information.

Seventh identity information of a UE, which is identity information of the UE when accessing the target donor node (anchor node), such as a CU/DU UE F1AP ID, Seventh identity information of an associated cell, wherein the associated cell indicated by the information is a cell accessed by the first node and served by the third node. The information serves to inform the first node that the configuration information included in the following seventh configuration information of a user service is valid only when the first node accesses the associated cell, Seventh configuration information of a user service, wherein the information may include at least the following information.

Seventh information related to a radio bearer, wherein the radio bearer is a radio bearer that the first node can accept after accessing the third node. For a radio bearer, the information may include identity information of the radio bearer, and configuration information of a tunnel for transmitting data of the UE on the third node side, such as a transport layer address, and tunnel port identity information, etc.

In step 2b-5, a twelfth message is sent from the third node to the second node. The twelfth message may be a fourth confirm message, which serves to provide configuration information of one or more UE after handover to a cell served by the third node, and the cell is served through the first node. For one UE, the information included in the message may be a message configuring the UE to perform a handover.

After step 2b-5, the generated configuration message for notifying the UE to handover is sent from the second node to the first node, and then is sent from the first node to the UE.

Thus, only part of the configuration information of the UE needs to be transmitted in steps 2b-3 to 2b-4, thereby reducing the signaling overhead between interfaces and is speeding up the handover of the UE.

The messages used above may respectively be a second notification message: UE Context Notification message, a fourth request message: UE context group request message, a fourth response message: UE context group response message, a second notification response message: UE context notification response message, a fourth confirm message: UE Context Group Confirm Message, and a configuration message for notifying the UE to handover: RRCreconfiguration message.

The above message names are just for example, and other possible names can also be used.

In method 1 and method 2, before steps 2a-1/2b-1, the first node can determine whether to send the third message or the eighth message to the second node or the third node according to conditions 1, 2 or 3.

In condition 1, the first node receives the configuration message sent from the second node or the third node, the configuration message is used for instructing the first node to perform a handover, and a target cell is a cell served by the third node, or the configuration message is used for instructing the first node to perform a conditional handover, and a candidate cell for the conditional handover is a cell served by the third node.

In condition 2, the first node obtains configuration information of its serving cell from the OAM or the second node or the third node the first node obtains a cell that the first node can serve after accessing the third node (if there are two DUs at the first node, one DU is a DU1 that establishes an interface with the second node and the other DU is a DU2 that establishes an interface with the third node, then the serving cell is a serving cell of the DU2), and is used for providing service for the UE accessing the first node.

In condition 3, the first node completes the resource allocation or context setup or access control of the UE accessing the node (if there are two DUs at the first node, one DU is DU1 that establishes an interface with the second node and the other DU is DU2 that establishes an interface with the third node, then the resource allocation or context setup or access control here is completed by DU2). The resource allocation or context setup or access control can be performed when the first node accesses a serving cell of the third node, the first node obtains the serving cell of the third node (e.g., the second node or the third node sends the configuration message for migration/handover to the serving cell of the third node to the first node, e.g., the RRCReconfiguration message, the first node obtains at least one serving cell of third node (e.g., the second node or the third node sends a configuration message for the conditional migration/handover to the serving cell of the third node to the first node, such as an RRCReconfiguration message, which includes one or more candidate cells belonging to the third node). In this case, the first node may perform the resource allocation or context setup or access control for each candidate cell, or may perform the resource allocation or context setup or access control for all candidate cells, or the first node obtains at least one serving cell of the third node (e.g., the second node or the third node sends a configuration message about conditional migration/handover to the serving cell of the third node to the first node, such as an RRCReconfiguration message, which includes one or more candidate cells belonging to the third node), and a candidate cell is selected (if an execution condition for accessing the candidate cell is satisfied, the execution condition may be that the signal quality of the cell is greater than a threshold value).

Figure 9:
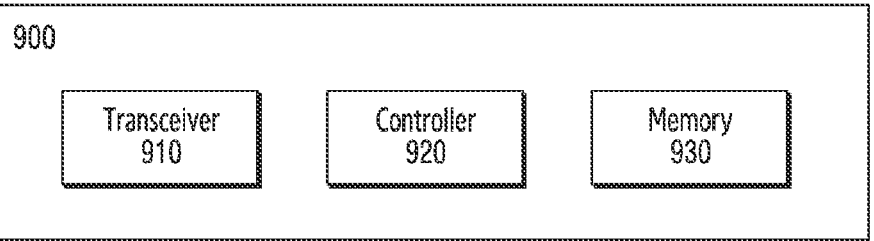
FIG. 9 illustrates a base station (BS), according to an embodiment.

FIG. 9 illustrates a BS, according to an embodiment.

Referring to FIG. 9 is, the BS may include a transceiver 910, a memory 930, and a processor (or, a controller) 920. The transceiver 910, the memory 930, and the processor (or controller) 920 of the BS may operate according to a communication method of the BS described. However, the components of the BS are not limited thereto. For example, the BS may include more or fewer components than those described in FIG. 11. In addition, the processor (or controller) 920, the transceiver 910, and the memory 930 may be implemented as a single chip and may include at least one processor.

The transceiver 910 collectively refers to a BS receiver and a BS transmitter and may transmit/receive a signal to/from a terminal, another BS, and/or a core network function(s) (or entity(s)). The signal transmitted or received to or from the BS may include control information and data. The transceiver 910 may include an RF transmitter for up-converting and amplifying a frequency of a transmitted signal, and a RF receiver for amplifying low-noise and down-converting a frequency of a received signal. However, this is only an example of the transceiver 910 and components of the transceiver 910 are not limited to the RF transmitter and the RF receiver.

The transceiver 910 may receive and output, to the processor (or controller) 920, a signal through a wireless channel, and transmit a signal output from the processor (or controller) 920 through the wireless channel.

The memory 930 may store a program and data required for operations of the BS. The memory 930 may store control information or data included in a signal obtained by the BS. The memory 930 may be a storage medium, such as a read only memory (ROM), a random access memory (RAM), a hard disk, a CD-ROM, and a digital versatile disc (DVD), or a combination of storage media.

The processor (or controller) 920 may control a series of processes such that the BS operates as described. For example, the processor (or controller) 920 may receive a data signal and/or a control signal, and the processor (or controller) 920 may determine a result of receiving the signal transmitted by the terminal and/or the core network function.

Figure 10:
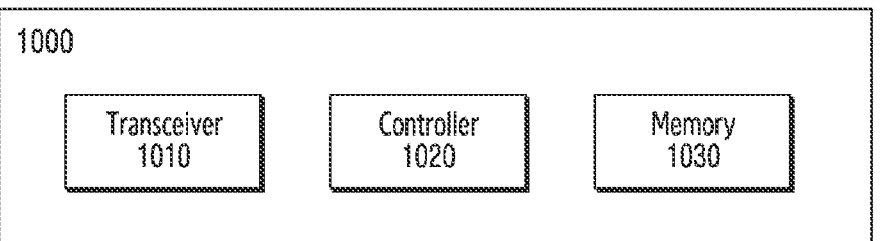
FIG. 10 illustrates a node according to an embodiment.

FIG. 10 illustrates a node according to an embodiment. The illustrated structure and function can also be applicable to a BS (or a central unit of the BS, or a control plane portion of the central unit of the BS, or a user plane portion of the central unit of the BS, or a distributed unit of the BS, etc.). The structure and function of the node described herein can be applicable to a donor node (anchor node) and a relay node.

Referring to FIG. 10, a node 1000 includes a transceiver 1010, a controller 1020, and a memory 1030. Under the control of the controller 1020 (which may be implemented as one or more processors), the node 1000 (including the transceiver 1010 and the memory 1030) is configured to perform the operations of the nodes described herein. Although the transceiver 1010, the controller 1020 and the memory 1030 are illustrated as separate entities, they may be implemented as a single entity, such as a single chip. The transceiver 1010, the controller 1020 and the memory 1030 may be electrically connected or coupled to each other. The transceiver 1010 may be configured to send signals to, and receive signals from, other network entities, the other network entities are another node and/or UE etc. The transceiver 1010 may be omitted. In this case, the controller 1020 may be configured to execute instructions (including computer programs) stored in the memory 1030 to control the overall operation of the node 1000, thereby implementing the operation of the node described herein.

Figure 11:
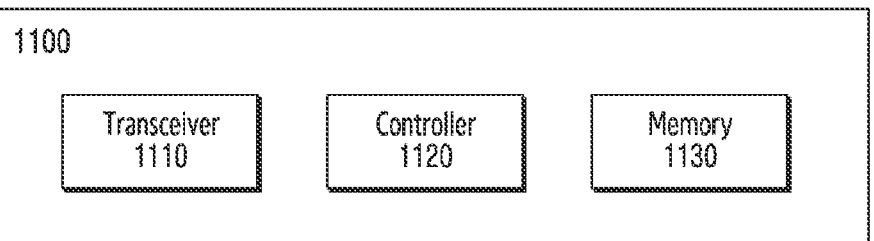
FIG. 11 illustrates a UE according to an embodiment.

FIG. 11 illustrates a UE according to an embodiment.

Referring to FIG. 11, the UE 1100 includes a transceiver 1110, a controller 1120, and a memory 1130. Under the control of the controller 1120 (which may be implemented as one or more processors), the UE 1100 (including a transceiver 1110 and a memory 1130) is configured to perform the operations of the UE described herein. Although the transceiver 1110, the controller 1120 and the memory 1130 are illustrated as separate entities, they may be implemented as a single entity, such as a single chip. The transceiver 1110, the controller 1120 and the memory 1130 may be electrically connected or coupled to each other. The transceiver 1110 may be configured to send signals to, and receive signals from, other network entities, the other network entities are nodes and another UE, etc. The transceiver 1110 may be omitted. In this case, the controller 1120 may be configured to execute instructions (including computer programs) stored in the memory 1130 to control the overall operation of the UE 1100, thereby performing the operation of the UE described herein.

The methods according to the embodiments described herein may be implemented in hardware, software, or a combination of hardware and software.

When the electrical structures and methods are implemented in software, a computer-readable recording medium having one or more programs (software modules) recorded thereon may be provided. The one or more programs recorded on the computer-readable recording medium are configured to be executable by one or more processors in an electronic device. The one or more programs include instructions to execute the methods according to the embodiments described herein.

The programs (e.g., software modules or software) may be stored in a RAM, non-volatile memory including flash memory, ROM, electrically erasable programmable read-only memory (EEPROM), a magnetic disc storage device, compact disc-ROM (CD-ROM), a DVD, another type of optical storage device, or a magnetic cassette. Alternatively, the programs may be stored in a memory system including a combination of some or all of the-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according the embodiments herein. Another storage device on the communication network may also be connected to the apparatus performing the embodiments of the present disclosure.

Those skilled in the art may realize that the present disclosure may be implemented in other specific forms without changing the technical idea or basic features of the present disclosure. Therefore, it should be understood that the-described embodiments are merely examples and not limitative. The scope of the present disclosure is defined by the appended claims rather than the detailed description. Therefore, it should be understood that all modifications or changes derived from the meaning and scope of the appended claims and their equivalents fall within the scope of the present disclosure.

In the embodiments of the present disclosure, all operations and messages may be selectively performed or may be omitted. In addition, the operations in each embodiment do not need to be performed sequentially, and the order of operations may vary. Messages do not need to be transmitted in order, and the transmission order of messages may change. Each operation and transfer of each message can be performed independently.

While the disclosure has been illustrated and described with reference to various embodiments of the present disclosure, those skilled in the art will understand that various changes can be made in form and detail without departing from the spirit and scope of the present disclosure as defined by the appended claims and their equivalents.

What is claimed is:

1. A method performed by a source donor node in a wireless communication system, the method comprising:
receiving, from a relay node, first configuration information for serving services of a user equipment (UE);
transmitting, to a source access and mobility management function (AMF) entity, a first message related to handover for the relay node, wherein the first message includes identity information for identifying the relay node and part of the first configuration information for serving the services; and
receiving, from the source AMF entity, a second message related to handover for the relay node, wherein the second message includes the identity information for identifying the relay node,
wherein the first message includes first forwarding information and first data information,
wherein the first forwarding information includes second configuration information used by the source donor node to forward data on an interface between the source donor node and the relay node, and
wherein the first data information includes information of forwarded data on the interface.

2. The method of claim 1,
wherein the second message includes at least one of second forwarding information or second data information,
wherein the second forwarding information is used by the source donor node to forward data on the interface, and
wherein the second data information includes information of forwarded data on the interface.

3. The method of claim 1, wherein the first data information includes at least one of target identity information, data packet information, or data packet configuration information, and wherein the first forwarding information includes at least one of data identity information, first configuration information, or second configuration information.

4. The method of claim 3, wherein the target identity information includes at least one of identity information of a target node, or identity information of a tracking area, wherein the data packet configuration information includes at least one of first address information, first port information, or first endpoint identity information, and wherein the data identity information includes at least one of traffic identity information, identity information of backhaul link information, address information, identity information of a protocol data unit (PDU) session, identity information of a quality of service (QoS) flow, identity information of a data radio bearer (DRB), identity information of a tunnel, or identity information of a transport layer association.

5. The method of claim 3, wherein the first configuration information includes at least one of third address information, third port information, or third endpoint identity information, and wherein the second configuration information includes at least one of second address information, second port information, or second endpoint identity information.

6. A source donor node comprising:

at least one transceiver;

at least one processor communicatively coupled to the at least one transceiver; and at least one memory, communicatively coupled to the at least one processor, storing instructions executable by the at least one processor individually or in any combination to cause the source donor node to:

receive, from a relay node, first configuration information for serving services of a user equipment (UE);

transmit, to a source access and mobility management function (AMF) entity, a first message related to handover for the relay node, wherein the first message includes identity information for identifying the relay node and part of the first configuration information for serving the services; and receive, from the source AMF entity, a second message related to handover for the relay node, wherein the second message includes the identity information for identifying the relay node, wherein the first message includes first forwarding information and first data information, wherein the first forwarding information includes second configuration information used by the source donor node to forward data between the source donor node and the relay node, and wherein the first data information includes information of forwarded data on the interface.

7. The source donor node of claim 6, wherein the second message includes at least one of second forwarding information or second data information, wherein the second forwarding information is used by the source donor node to forward data on the interface, and wherein the second data information includes information of forwarded data on the interface.

8. The source donor node of claim 6, wherein the first data information includes at least one of target identity information, data packet information, or data packet configuration information, and wherein the first forwarding information includes at least one of data identity information, first configuration information, or second configuration information.

9. The source donor node of claim 8, wherein the target identity information includes at least one of identity information of a target node, or identity information of a tracking area, wherein the data packet configuration information includes at least one of first address information, first port information, or first endpoint identity information, and wherein the data identity information includes at least one of traffic identity information, identity information of backhaul link information, address information, identity information of a protocol data unit (PDU) session, identity information of a quality of service (QoS) flow, identity information of a data radio bearer (DRB), identity information of a tunnel, or identity information of a transport layer association.

10. The source donor node of claim 8, wherein the first configuration information includes at least one of third address information, third port information, or third endpoint identity information, and wherein the second configuration information includes at least one of second address information, second port information, or second endpoint identity information.

11. A method performed by a source access and mobility management function (AMF) entity in a wireless communication system, the method comprising:

receiving, from a source donor node, a first message related to handover for a relay node, wherein the first message includes identity information for identifying the relay node and part of first configuration information for serving services of a user equipment (UE); and transmitting, to the source donor node, a second message related to handover for the relay node, wherein the second message includes the identity information for identifying the relay node, wherein the first message includes first forwarding information and first data information, wherein the first forwarding information includes second configuration information used by the source donor node to forward data on an interface between the source donor node and the relay node, wherein the first data information includes information of forwarded data on the interface, and wherein the first configuration information for serving the service is accepted by the relay node.

12. The method of claim 11, wherein the second message includes at least one of second forwarding information or second data information, wherein the second forwarding information is used by the source donor node to forward data on the interface, and wherein the second data information includes information of forwarded data on the interface.

13. The method of claim 11, wherein the first data information includes at least one of target identity information, data packet information, or data packet configuration information, and wherein the first forwarding information includes at least one of data identity information, first configuration information, or second configuration information.

14. The method of claim 13, wherein the target identity information includes at least one of identity information of a target node, or identity information of a tracking area, wherein the data packet configuration information includes at least one of first address information, first port information, or first endpoint identity information, and wherein the data identity information includes at least one of traffic identity information, identity information of backhaul link information, address information, identity information of a protocol data unit (PDU) session, identity information of a quality of service (QoS) flow, identity information of a data radio bearer (DRB), identity information of a tunnel, or identity information of a transport layer association.

15. The method of claim 13, wherein the first configuration information includes at least one of third address information, third port information, or third endpoint identity information, and wherein the second configuration information includes at least one of second address information, second port information, or second endpoint identity information.

16. A source access and mobility management function (AME) entity comprising:

at least one transceiver;

at least one processor communicatively coupled to the at least one transceiver; and at least one memory, communicatively coupled to the at least one processor, storing instructions executable by the at least one processor individually or in any combination to cause the source AMF entity to:

receive, from a source donor node, a first message related to handover for a relay node, wherein the first message includes identity information for identifying the relay node and part of first configuration information for serving services of a user equipment (UE); and transmit, to the source donor node, a second message related to handover for the relay node, wherein the second message includes the identity information for identifying the relay node, wherein the first message includes first forwarding information and first data information, wherein the first forwarding information includes second configuration information used by the source donor node to forward data on an interface between the source donor node and the relay node, wherein the first data information includes information of forwarded data on the interface, and wherein the first configuration information for serving the service is accepted by the relay node.

17. The source AMF entity of claim 16, wherein the second message includes at least one of second forwarding information or second data information, wherein the second forwarding information is used by the source donor node to forward data on the interface, and wherein the second data information includes information of forwarded data on the interface.

18. The source AMF entity of claim 16, wherein the first data information includes at least one of target identity information, data packet information, or data packet configuration information, and wherein the first forwarding information includes at least one of data identity information, first configuration information, or second configuration information.

19. The source AMF entity of claim 18, wherein the target identity information includes at least one of identity information of a target node, or identity information of a tracking area, wherein the data packet configuration information includes at least one of first address information, first port information, or first endpoint identity information, and wherein the data identity information includes at least one of traffic identity information, identity information of backhaul link information, address information, identity information of a protocol data unit (PDU) session, identity information of a quality of service (QoS) flow, identity information of a data radio bearer (DRB), identity information of a tunnel, or identity information of a transport layer association.

20. The source AMF entity of claim 18, wherein the first configuration information includes at least one of third address information, third port information, or third endpoint identity information, and wherein the second configuration information includes at least one of second address information, second port information, or second endpoint identity information.

* * * * *